US011814205B2

(12) United States Patent
Lancaster, III et al.

(10) Patent No.: US 11,814,205 B2
(45) Date of Patent: Nov. 14, 2023

(54) PACKAGING MATERIAL EVALUATION AND APPARATUS THEREFOR FOR SENSING PACKAGING MATERIAL FLAWS

(71) Applicant: Lantech.com, LLC, Louisville, KY (US)

(72) Inventors: Patrick R. Lancaster, III, Louisville, KY (US); Michael P. Mitchell, Louisville, KY (US); Christian Michael Gruner, Louisville, KY (US); Jean-Louis Limousin, Louisville, KY (US)

(73) Assignee: Lantech.com, LLC, Louisville, KY (US)

( * ) Notice: Subject to any disclaimer, the term of this patent is extended or adjusted under 35 U.S.C. 154(b) by 664 days.

(21) Appl. No.: 16/821,050

(22) Filed: Mar. 17, 2020

(65) Prior Publication Data

US 2020/0299016 A1 Sep. 24, 2020

Related U.S. Application Data

(60) Provisional application No. 62/821,146, filed on Mar. 20, 2019.

(51) Int. Cl.
*B65B 57/04* (2006.01)
*B65B 41/16* (2006.01)
(Continued)

(52) U.S. Cl.
CPC ............. *B65B 57/04* (2013.01); *B65B 11/02* (2013.01); *B65B 11/025* (2013.01);
(Continued)

(58) Field of Classification Search
CPC ......... B65B 57/04; B65B 57/20; B65B 11/02; B65B 11/025; B65B 11/045; B65B 41/16;
(Continued)

(56) References Cited

U.S. PATENT DOCUMENTS 4,079,565 A * 3/1978 Lancaster, III ....... B65B 11/025
53/556
4,224,824 A 9/1980 Giusti
(Continued)

FOREIGN PATENT DOCUMENTS

CN 203551161 U 4/2014
EP 3941867 A1 1/2022
(Continued)

OTHER PUBLICATIONS

Australian Patent Office, Examination Report No. 1 for Application No. 2020241849, 3 pages, dated Jul. 28, 2022.
(Continued)

*Primary Examiner* — Dariush Seif
(74) *Attorney, Agent, or Firm* — Gray Ice Higdon

(57) ABSTRACT

A method, apparatus and program product may evaluate a packaging material to determine various metrics associated with the packaging material. An apparatus may be used to sense flaws in packaging material, and in some instances, to accommodate such flaws by temporarily increasing a dispense rate of a packaging material dispenser.

38 Claims, 17 Drawing Sheets

(51) Int. Cl.
*B65B 11/02* (2006.01)
*B65B 11/04* (2006.01)
*B65H 26/02* (2006.01)
*G01L 5/102* (2020.01)
*B65B 11/00* (2006.01)

(52) U.S. Cl.
CPC ............ *B65B 11/045* (2013.01); *B65B 41/16* (2013.01); *B65H 26/025* (2013.01); *G01L 5/102* (2013.01); *B65B 2011/002* (2013.01); *B65B 2408/40* (2013.01)

(58) Field of Classification Search
CPC ........... B65B 2011/002; B65B 2210/16; B65B 2210/20; B65H 26/025; B65H 2408/40; G01L 5/102
See application file for complete search history.

(56) References Cited

U.S. PATENT DOCUMENTS

| | | | | |
|---|---|---|---|---|
| 4,496,417 A * | 1/1985 | Haake | ................ | B32B 38/1825 156/550 |
| 4,503,658 A * | 3/1985 | Mouser | ................ | B29C 55/06 53/399 |
| 4,519,249 A * | 5/1985 | Hunt | ................ | G01N 29/4427 73/159 |
| 4,682,038 A * | 7/1987 | Focke | ................ | B65H 23/0216 250/548 |
| 5,031,896 A * | 7/1991 | Winkler | ................ | H01H 35/00 271/265.01 |
| 5,426,509 A * | 6/1995 | Peplinski | ................ | G01N 21/89 356/402 |
| 5,488,814 A * | 2/1996 | Rankin | ................ | B65B 25/148 53/399 |
| 5,572,850 A * | 11/1996 | Lancaster, III | ....... | B65B 11/045 53/399 |
| 5,765,344 A * | 6/1998 | Mandeville | ........... | B65B 11/025 53/556 |
| 6,314,333 B1 * | 11/2001 | Rajala | ................ | B65H 23/1888 318/7 |
| 6,594,970 B1 * | 7/2003 | Hyne | ................ | B65B 11/025 53/399 |
| 7,568,327 B2 * | 8/2009 | Lancaster, III | ....... | B65B 11/025 53/210 |
| 7,707,901 B2 | 5/2010 | Lancaster et al. | | |
| 7,773,226 B2 * | 8/2010 | Hofeldt | ................ | B65H 43/00 356/431 |
| 8,001,745 B2 | 8/2011 | Carter | | |
| 8,053,056 B2 * | 11/2011 | Heikaus | ............. | B29C 66/1122 156/253 |
| 8,739,502 B2 * | 6/2014 | Lancaster, III | ....... | B65B 11/045 53/399 |
| 8,939,338 B2 * | 1/2015 | Turner | ................ | B65H 23/105 101/DIG. 42 |
| 9,776,748 B2 | 10/2017 | Lancaster | | |
| 9,896,229 B1 * | 2/2018 | Pierson | ................ | B65B 57/04 |
| 2003/0093973 A1 | 5/2003 | Mir | | |
| 2004/0182043 A1 * | 9/2004 | Viaud | ................ | A01F 15/0715 53/118 |
| 2006/0164647 A1 * | 7/2006 | Shibata | ................ | G01N 21/89 382/141 |
| 2006/0254225 A1 * | 11/2006 | Lancaster, III | ......... | B29C 55/06 53/556 |
| 2007/0204565 A1 * | 9/2007 | Lancaster, III | ....... | B65B 11/025 53/399 |
| 2008/0216450 A1 * | 9/2008 | MacLeod | ................ | B65B 31/08 53/287 |
| 2008/0295614 A1 * | 12/2008 | Lancaster, III | ....... | B65B 11/025 700/95 |
| 2008/0314542 A1 | 12/2008 | Rodriguez | | |
| 2009/0178374 A1 * | 7/2009 | Lancaster, III | ......... | B65B 57/02 700/240 |
| 2009/0235617 A1 * | 9/2009 | Moore | ................. | B65B 11/045 53/461 |
| 2010/0132572 A1 * | 6/2010 | Herbert | ................ | B65H 26/025 101/485 |
| 2010/0163443 A1 * | 7/2010 | Storig | ..................... | B65B 57/04 53/461 |
| 2011/0121119 A1 * | 5/2011 | Galea | ...................... | B29C 55/06 242/160.4 |
| 2011/0131927 A1 * | 6/2011 | Lancaster, III | ....... | B65B 11/045 53/64 |
| 2011/0179752 A1 * | 7/2011 | Lancaster, III | ....... | B65B 11/008 53/556 |
| 2013/0069284 A1 * | 3/2013 | De Bruin | ............. | B26F 1/0084 425/135 |
| 2013/0277487 A1 * | 10/2013 | Ohmura | ............... | B65H 26/025 242/419.8 |
| 2014/0116006 A1 * | 5/2014 | Lancaster, III | ....... | B65B 11/025 53/64 |
| 2014/0116007 A1 * | 5/2014 | Lancaster, III | ....... | B65B 11/025 53/64 |
| 2014/0116008 A1 | 5/2014 | Lancaster et al. | | |
| 2014/0223863 A1 | 8/2014 | Lancaster et al. | | |
| 2014/0223864 A1 * | 8/2014 | Lancaster, III | ......... | B65B 11/58 53/436 |
| 2015/0013556 A1 * | 1/2015 | Slaats | ..................... | B41F 33/18 702/35 |
| 2015/0197360 A1 * | 7/2015 | Lancaster, III | ....... | B65B 11/025 53/461 |
| 2015/0353220 A1 * | 12/2015 | Lancaster, III | ......... | B65B 57/18 53/461 |
| 2016/0096645 A1 | 4/2016 | Lancaster, III | | |
| 2016/0096646 A1 | 4/2016 | Lancaster, III et al. | | |
| 2016/0098171 A1 * | 4/2016 | Lancaster, III | ....... | B65B 59/003 715/835 |
| 2016/0229573 A1 * | 8/2016 | Grassi | ..................... | B65B 11/02 |
| 2016/0231252 A1 * | 8/2016 | Herrmann | .......... | G01N 21/8851 |
| 2017/0052075 A1 * | 2/2017 | Ceré | ......................... | G01L 5/04 |
| 2017/0057680 A1 * | 3/2017 | Schlichting | ........ | G06K 7/10425 |
| 2017/0088301 A1 * | 3/2017 | Riemenschneider, III | ................... | B65B 59/003 |
| 2017/0267480 A1 * | 9/2017 | Sakamoto | ............. | B65H 18/26 |
| 2017/0283106 A1 | 10/2017 | Lancaster, III | | |
| 2018/0257799 A1 * | 9/2018 | Ragsdale | ............. | B65B 11/045 |
| 2018/0257802 A1 * | 9/2018 | Resch | ..................... | B65B 57/02 |
| 2018/0346167 A1 * | 12/2018 | Capriotti | ................ | B65B 7/164 |
| 2020/0299016 A1 * | 9/2020 | Lancaster, III | ......... | B65B 57/18 |
| 2020/0377250 A1 * | 12/2020 | Lancaster, III | ...... | B65H 23/044 |
| 2021/0107757 A1 * | 4/2021 | Cere' | .................... | G01B 11/046 |
| 2022/0144473 A1 | 5/2022 | Levan | | |

FOREIGN PATENT DOCUMENTS

| | | |
|---|---|---|
| EP | 3941868 A1 | 1/2022 |
| EP | 3941869 A1 | 1/2022 |
| SE | 518241 | 9/2002 |
| WO | WO2016164776 A1 | 10/2016 |

OTHER PUBLICATIONS

Australian Patent Office, Examination Report No. 1 for Application No. 2020240019, 3 pages, dated Jul. 28, 2022.
Australian Patent Office, Examination Report No. 1 for Application No. 2020241375, 3 pages dated Aug. 1, 2022.
United States Patent and Trademark Office, Non-Final Office Action issued in U.S. Appl. No. 16/821,041, 111 pages, dated Sep. 22, 2022.
United States Patent and Trademark Office, Non-Final Office Action issued in U.S. Appl. No. 16/821,046, 58 pages, dated Sep. 29, 2022.
European Patent Office; Communication in Application No. 18858849.5 dated May 14, 2021.
Related Applications Transmittal dated May 13, 2021.
International Search Report and Written Opinion in application PCT/US2020/023087, dated Jun. 16, 2020.
International Search Report and Written Opinion in application PCT/US2020/023086, dated Jun. 26, 2020.

(56) References Cited

OTHER PUBLICATIONS

International Search Report and Written Opinion in application PCT/US2020/023088, dated Jun. 16, 2020.
United States Patent and Trademark Office; Notice of Allowance Issued in U.S. Appl. No. 16/821,041 dated Jan. 12, 2023.

* cited by examiner

PACKAGING MATERIAL EVALUATION AND APPARATUS THEREFOR FOR SENSING PACKAGING MATERIAL FLAWS

FIELD OF THE INVENTION

The invention generally relates to wrapping loads with packaging material through relative rotation of loads and a packaging material dispenser.

BACKGROUND OF THE INVENTION

Various packaging techniques have been used to build a load of unit products and subsequently wrap them for transportation, storage, containment and stabilization, protection and waterproofing. One system uses wrapping machines to stretch, dispense, and wrap packaging material, e.g., stretch wrap film, around a load. The packaging material may be pre-stretched before it is applied to the load. Wrapping can be performed as an inline, automated packaging technique that dispenses and wraps packaging material in a stretch condition around a load on a pallet to cover and contain the load. Stretch wrapping, whether accomplished by a turntable, rotating arm, vertical rotating ring, or horizontal rotating ring, typically covers the four vertical sides of the load with a stretchable packaging material such as polyethylene film. In each of these arrangements, relative rotation is provided between the load and the packaging material dispenser to wrap packaging material about the sides of the load.

Film breaks are one of the most frequent and problematic sources of machine downtime and loss of "centerline" wrapper settings to a standard. Film breaks have many causes inherent to the wrapping process that can be mitigated, including, for example, irregularities or sharp points in the load or pallet, mechanical issues with rollers and clamps, electronic control issues around maintenance of film or packaging material tension during start, acceleration, and ending of a wrap operation or cycle, etc. These various causes of film breaks may be mitigated in many instances with more effective handling of the wrapping process.

However, film breaks are also impacted by packaging material quality. Different films can vary considerably by thickness and/or chemical composition, and while thicker films generally provide greater strength and resistance to film breaks, competing cost and environmental concerns often drive the use of thinner and less expensive films in many applications. In addition, packaging material quality can also fluctuate from roll to roll, and random and unpredictable changes in packaging material characteristics (often within a single packaging material roll) can cause a packaging material's resistance to film breaks to be reduced. Random flaws in a packaging material web such as gels, holes, carbon particles, gauge bands, etc., including shipping and handling damage to the packaging material roll remain problematic since they are generally difficult to sense or predict.

When film breaks occur due to packaging material quality, many operators are left with the choice of tolerating the downtime and hassle of film breaks or lowering the packaging material tension until the film breaks are reduced to a tolerable level. The lowered packaging material tension either compromises the containment force and leaves loads more susceptible to damage during shipping, or requires additional layers (i.e., more packaging material) to maintain the desired containment force. Accordingly, a need continues to exist for a manner of evaluating packaging material quality and/or comparing different types of packaging material to assist in selection of an appropriate packaging material for a particular application and/or configuration of a stretch wrapping machine for operation with a selected type of packaging material.

SUMMARY OF THE INVENTION

The invention addresses these and other problems associated with the art by providing a method, apparatus and program product that evaluate a packaging material to determine various metrics associated with the packaging material and/or to detect flaws in a packaging material.

Therefore, consistent with one aspect of the invention, a stretch wrap packaging material test apparatus may include a take up drum configured to receive a web of packaging material, where the take up drum is rotatable about a rotational axis thereof to wind the web of packaging material about the take up drum, and where the take up drum includes a take up drum drive configured to rotate the take up drum about the rotational axis thereof, first and second drum members respectively spanning first and second arcuate portions of the take up drum, and a force sensor positioned between the first and second drum members to sense a containment force imparted about the take up drum by the web of packaging material wound about the take up drum, and a packaging material delivery system disposed upstream of the take up drum and configured to convey the web of packaging material from a packaging material roll to the take up drum during rotation of the take up drum.

In some embodiments, the packaging material delivery system includes upstream and downstream pre-stretch rollers configured for rotation at different rates of rotation to pre-stretch the web of packaging material prior to winding the web of packaging material about the take up drum. Also, in some embodiments, the packaging material delivery system further includes upstream and downstream pre-stretch drives respectively configured to rotate the upstream and downstream pre-stretch rollers during rotation of the take up drum. Further, in some embodiments, each of the upstream and downstream pre-stretch drives includes a servo motor.

In some embodiments, the packaging material delivery system further includes an intake roller disposed intermediate the upstream pre-stretch roller and the packaging material roll, and an intake drive configured to rotate the intake roller during rotation of the take up drum to mitigate roll effects. In addition, some embodiments may also include first and second idle rollers, the first idle roller disposed intermediate the upstream and downstream pre-stretch rollers and the second idle roller disposed intermediate the downstream pre-stretch roller and the take up drum, and first and second force sensors respectively coupled to the first and second idle rollers to sense a force in first and second portions of the web of packaging material engaging the first and second idle rollers.

Some embodiments may also include a controller coupled to the take up drum drive and the upstream and downstream pre-stretch drives to control rates of rotation of the take up drum and the upstream and downstream pre-stretch rollers, the controller further coupled to the force sensor to record the containment force sensed by the force sensor during rotation of the take up drum and the upstream and downstream pre-stretch rollers. In some embodiments, the controller is configured to control the upstream and downstream pre-stretch drives to control an amount of pre-stretch applied to the web of packaging material. In addition, in some embodiments, the take up drum includes a substantially cylindrical outer surface about which the web of packaging material is wound, and the controller is configured to vary the rate of rotation of at least one of the take up drum drive and the upstream and downstream pre-stretch drives to simulate winding of the web of packaging material around a rectangular load.

Moreover, in some embodiments, the controller is configured to vary the rate of rotation of at least one of the take up drum drive and the upstream and downstream pre-stretch drives to simulate winding of the web of packaging material around a rectangular load having predetermined dimensions. In some embodiments, the controller is further configured to determine an incremental containment force per layer from the containment force sensed by the force sensor over a plurality of full revolutions of the take up drum. Some embodiments may also include a rotation sensor configured to sense rotation of the take up drum, where the controller is configured to detect each of the plurality of full revolutions using the rotation sensor.

Moreover, in some embodiments, the take up drum includes a substantially cylindrical outer surface about which the web of packaging material is wound, where a first portion of the substantially cylindrical outer surface is disposed on the first drum member and the second portion of the substantially cylindrical outer surface is disposed on the second drum member. In some embodiments, the first and second drum members are movable relative to one another to compress the force sensor in response to the containment force imparted about the take up drum by the web of packaging material wound about the take up drum. In addition, in some embodiments, the first and second drum members are coupled to one another through a hinge.

In some embodiments, the take up drum includes a rotation shaft about which the take up drum rotates, where the first drum member is fixedly coupled to the rotation shaft, and where the hinge couples the first and second drum members to enable the second drum member to pivot about a pivot axis that is substantially parallel to the rotation shaft of the take up drum. Moreover, in some embodiments, the first and second drum members each span about 180 degrees of the take up drum and mate at each of respective first and second ends thereof, where the hinge couples the first and second drum members proximate the respective first ends thereof, and where the force sensor is disposed proximate the respective second ends thereof.

Also, in some embodiments, the force sensor includes a plurality of load cells, each of the plurality of load cells mounted to one of the first and second drum members and configured to engage an opposing surface defined on the other of the first and second drum members when the second drum member is pivoted about the hinge and toward the first drum member in response to the containment force imparted about the take up drum by the web of packaging material wound about the take up drum. In some embodiments, the packaging material is a stretch wrap packaging material of a type used in a load wrapping apparatus that wraps a load with packaging material dispensed from a packaging material dispenser while providing relative rotation between the load and the packaging material dispenser about an axis of rotation.

Consistent with another aspect of the invention, a stretch wrap packaging material test apparatus may include a take up drum configured to receive a web of packaging material, where the take up drum is rotatable about a rotational axis thereof to wind the web of packaging material about the take up drum, and where the take up drum includes a take up drum drive configured to rotate the take up drum about the rotational axis thereof, a substantially cylindrical outer surface about which the web of packaging material is wound, and a force sensor coupled to the take up drum to sense a containment force imparted about the substantially cylindrical outer surface of the take up drum by the web of packaging material wound about the take up drum, and a packaging material delivery system disposed upstream of the take up drum and configured to convey the web of packaging material from a packaging material roll to the take up drum during rotation of the take up drum.

In addition, in some embodiments, the take up drum further includes first and second drum members respectively spanning first and second arcuate portions of the take up drum and respectively supporting first and second portions of the substantially cylindrical outer surface, and the force sensor is positioned between the first and second drum members to sense the containment force imparted about the take up drum by the web of packaging material wound about the take up drum.

In addition, some embodiments may further include a controller coupled to the packaging material delivery system, the take up drum drive and the force sensor, the controller configured to determine a containment force imparted to the drum using the force sensor. Moreover, in some embodiments, the controller is configured to determine the containment force imparted to the take up drum after a predetermined time to sense the containment force imparted to the take up drum after relaxation of the packaging material wound about the take up drum.

Further, in some embodiments, the packaging material delivery system includes upstream and downstream pre-stretch rollers respectively coupled to upstream and downstream pre-stretch drives and pre-stretch and dispense force sensors respectively configured to sense tension in the web of packaging material between the upstream and downstream pre-stretch rollers and between the downstream pre-stretch roller and the take up drum, and the controller is configured to test the packaging material by wrapping one or more layers of packaging material about the take up drum, controlling the upstream and downstream pre-stretch drives to stop the upstream and downstream pre-stretch rollers while controlling the take up drum drive to rotate the take up drum, and generating stress strain data during rotation of the take up drum while the upstream and downstream pre-stretch rollers are stopped.

Some embodiments may also include an idle roller disposed between the packaging material dispensing system and the take up drum, and a support mechanism configured to support the idle roller at each of a plurality of positions to vary a length of unsupported packaging material between the packaging material delivery system and the take up drum.

Consistent with another aspect of the invention, a method of determining containment force for a stretch wrap packaging material may include supplying a web of packaging material from a packaging material roll to a take up drum using a packaging material delivery system disposed upstream of the take up drum, rotating the take up drum about a rotational axis thereof to wind the web of packaging material about the take up drum, and sensing a containment force imparted about the take up drum by the web of packaging material wound about the take up drum using a force sensor positioned between first and second drum members respectively spanning first and second arcuate portions of the take up drum.

Consistent with another aspect of the invention, a method of evaluating a stretch wrap packaging material may include forming a plurality of simulated flaws in a packaging material, conveying the packaging material from a packaging material roll to a take up drum through a packaging material delivery system that applies a controlled stretch to the packaging material prior to the packaging material being wrapped around the take up drum, and varying the controlled stretch while conveying the packaging material from the packaging material roll to the take up drum to determine an amount of controlled stretch at which a simulated flaw among the plurality of simulated flaws exhibits a predetermined behavior.

Also, in some embodiments, the predetermined behavior is a film break. Further, in some embodiments, the predetermined behavior is a predetermined length of tear formed in response to the simulated flaw, a predetermined shape or size of hole formed in response to the simulated flaw, or a hole formed in response to the simulated flaw propagating to a rope. In some embodiments, the packaging material delivery system applies the controlled stretch in part by controlling a dispense rate of the packaging material delivery system relative to a rate at which the packaging material is wrapped around the take up drum, and varying the controlled stretch further includes varying the dispense rate of the packaging material delivery system. Also, in some embodiments, the dispense rate includes a payout percentage.

In some embodiments, the packaging material delivery system includes a pre-stretch assembly, and varying the controlled stretch further includes varying a pre-stretch setting of the pre-stretch assembly. Some embodiments may also include determining a plurality of combinations of dispense rates and pre-stretch settings at which a simulated flaw among the plurality of simulated flaws exhibits the predetermined behavior. Some embodiments may further include narrowing a width of the packaging material while conveying the packaging material from the packaging material roll to the take up drum to inhibit full separation of the packaging material in response to a simulated flaw. Some embodiments may also include determining a specific containment force for the packaging material at varying amounts of controlled stretch applied by the packaging material delivery system.

In some embodiments, determining the specific containment force is performed using packaging material without any simulated flaws. Further, in some embodiments, determining the specific containment force for the packaging material at varying amounts of controlled stretch includes determining a first specific containment force for the packaging material at a first amount of controlled stretch by determining an incremental containment force for the packaging material when conveying the packaging material from the packaging material roll to the take up drum with the packaging material delivery system applying the first amount of controlled stretch, determining a weight or cost of the packaging material per length, and calculating a ratio between the determined incremental containment force and the determined weight or cost of the packaging material per length.

Also, in some embodiments, determining the first specific containment force further includes scaling the determined weight or cost of the packaging material per length by the first amount of controlled stretch. In addition, in some embodiments, determining the weight or cost of the packaging material per length includes determining the weight of the packaging material by weighing a predetermined length of unstretched packaging material. In some embodiments, the take up drum is generally cylindrical and has a predetermined circumference, determining the first specific containment force further includes determining a weight or cost of the packaging material per layer of packaging material wrapped around the take up drum, and calculating the ratio includes dividing the determined incremental containment force by the determined weight or cost of the packaging material per layer.

In addition, in some embodiments, the take up drum includes a force sensor positioned between first and second drum members respectively spanning first and second arcuate portions of the take up drum, and determining the incremental containment force is determined using the force sensor. Also, in some embodiments, forming the plurality of simulated flaws includes puncturing the packaging material roll.

In addition, in some embodiments, puncturing the packaging material roll includes striking the packaging material roll with a hole punch. In some embodiments, the hole punch is a hammer driven hole punch configured to form a hole between about 0.20 mm and about 3 mm in diameter.

Further, in some embodiments, forming the plurality of simulated flaws includes puncturing the packaging material with a hole punch mounted to a test apparatus that further includes the packaging material delivery system and the take up drum, and the take up drum is generally cylindrical and includes a force sensor positioned between first and second drum members respectively spanning first and second arcuate portions of the take up drum and configured to sense containment force imparted on the body by the packaging material. In addition, in some embodiments, forming the plurality of simulated flaws includes puncturing the packaging material with a pressurized fluid expelled by a nozzle disposed proximate to the packaging material and coupled to a source of pressurized fluid via a solenoid-actuated valve. Further, in some embodiments, the nozzle is disposed downstream of a pre-stretch region of the packaging material delivery system. Moreover, in some embodiments, the nozzle is disposed upstream of a pre-stretch region of the packaging material delivery system. Further, in some embodiments, the nozzle is disposed within a pre-stretch region of the packaging material delivery system.

Consistent with another aspect of the invention, a method of evaluating a stretch wrap packaging material may include conveying a web of packaging material from a packaging material roll to a body through a packaging material delivery system that applies a controlled stretch to the packaging material prior to the packaging material being wrapped around the body, forming a plurality of simulated flaws in the web of packaging material as the web of packaging material is conveyed to the body by puncturing the packaging material with a pressurized fluid expelled by a nozzle disposed proximate to the web of packaging material and coupled to a source of pressurized fluid, and varying the controlled stretch while conveying the web of packaging material from the packaging material roll to the body to subject the plurality of simulated flaws to varying amounts of controlled stretch.

Some embodiments may also include determining an amount of controlled stretch at which a simulated flaw among the plurality of simulated flaws exhibits a predetermined behavior. In some embodiments, the nozzle is disposed upstream or downstream of a pre-stretch region of the packaging material delivery system. Moreover, in some embodiments, the nozzle is disposed within a pre-stretch region of the packaging material delivery system. Further, in some embodiments, the nozzle is coupled to the source of pressurized fluid by a solenoid-actuated valve, and forming the plurality of simulated flaws includes forming each simulated flaw by actuating the solenoid-actuated valve. In addition, in some embodiments, the source of pressurized fluid includes a pressurized air source.

Consistent with another aspect of the invention, a method of evaluating a stretch wrap packaging material may include conveying the packaging material from a packaging material roll to a take up drum through a packaging material delivery system that applies a controlled stretch to the packaging material prior to the packaging material being wrapped around the take up drum, varying the controlled stretch while conveying the packaging material from the packaging material roll to the take up drum to determine an incremental containment force applied to the take up drum by the packaging material wrapped around the take up drum at varying amounts of controlled stretch, and determining a specific containment force for the packaging material at each of the varying amounts of controlled stretch using the determined incremental containment force at each of the varying amounts of controlled stretch.

In addition, in some embodiments, the packaging material delivery system applies the controlled stretch in part by controlling a dispense rate of the packaging material delivery system relative to a rate at which the packaging material is wrapped around the take up drum, and varying the controlled stretch further includes varying the dispense rate of the packaging material delivery system. Also, in some embodiments, the dispense rate includes a payout percentage. Moreover, in some embodiments, the packaging material delivery system includes a pre-stretch assembly, and varying the controlled stretch further includes varying a pre-stretch setting of the pre-stretch assembly. In some embodiments, determining the specific containment force for the packaging material at each of the varying amounts of controlled stretch includes determining a first specific containment force for the packaging material at a first amount of controlled stretch by determining an incremental containment force for the packaging material when conveying the packaging material from the packaging material roll to the take up drum with the packaging material delivery system applying the first amount of controlled stretch, determining a weight or cost of the packaging material per length, and calculating a ratio between the determined incremental containment force and the determined weight or cost of the packaging material per length.

Further, in some embodiments, determining the first specific containment force further includes scaling the determined weight or cost of the packaging material per length by the first amount of controlled stretch. Also, in some embodiments, determining the weight or cost of the packaging material per length includes determining the weight of the packaging material by weighing a predetermined length of unstretched packaging material. Further, in some embodiments, the take up drum is generally cylindrical and has a predetermined circumference, determining the first specific containment force further includes determining a weight or cost of the packaging material per layer of packaging material wrapped around the take up drum, and calculating the ratio includes dividing the determined incremental containment force by the determined weight or cost of the packaging material per layer. Also, in some embodiments, the take up drum includes a force sensor positioned between first and second drum members respectively spanning first and second arcuate portions of the take up drum, and determining the incremental containment force is determined using the force sensor.

Consistent with another aspect of the invention, a method of evaluating a flaw in a stretch wrap packaging material may include conveying a web of packaging material from a packaging material roll to a body through a packaging material delivery system that applies a controlled stretch to the packaging material prior to the packaging material being wrapped around the body, where a portion of the web of packaging material includes a flaw, sensing a hole associated with the flaw and propagated in the portion of the web of packaging material as a result of application of the controlled stretch to the portion of the web of packaging material using one or more sensors, and characterizing the flaw in response to sensing the hole with the one or more sensors.

In addition, in some embodiments, the one or more sensors includes one or more ultrasonic sensors or one or more optical sensors. Moreover, in some embodiments, characterizing the flaw includes determining a position of the flaw along a width of the web of packaging material using the one or more sensors. In some embodiments, the packaging material delivery system includes an idle roller over which the web of packaging material is conveyed under tension, the one or more sensors includes first and second force sensors positioned to sense forces applied proximate first and second ends of the idle roller by the web of packaging material, and determining the position of the flaw along the width of the web of packaging material includes determining the position of the flaw using the forces sensed by the first and second force sensors.

Further, in some embodiments, determining the position of the flaw using the forces sensed by the first and second force sensors includes comparing first and second drops in force respectively sensed by the first and second force sensors. In some embodiments, characterizing the flaw includes determining a severity of the flaw based upon a size of the associated hole sensed using the one or more sensors. Moreover, in some embodiments, the packaging material delivery system includes an idle roller over which the web of packaging material is conveyed under tension, the one or more sensors includes a force sensor positioned to sense a force applied to the idle roller by the web of packaging material, and determining the severity of the flaw includes determining the size of the associated hole based upon a drop in force sensed by the force sensor.

Consistent with another aspect of the invention, a method of tracking flaws in a roll of stretch wrap packaging material may include conveying a web of packaging material from a packaging material roll to a body through a packaging material delivery system that applies a controlled stretch to the packaging material prior to the packaging material being wrapped around the body, detecting flaws in the web of packaging material as the web of packaging material is conveyed to the body with the controlled stretch applied thereto using a sensor, and counting a number of detected flaws detected by the sensor.

Further, in some embodiments, the packaging material delivery system includes a pre-stretch assembly including upstream and downstream pre-stretch rollers, and detecting flaws in the web of packaging material includes detecting flaws between the upstream and downstream pre-stretch rollers. In some embodiments, detecting flaws in the web of packaging material includes detecting flaws between the packaging material delivery system and the body. Also, in some embodiments, the sensor includes a force sensor configured to measure a force in the web of packaging material, where detecting the flaws is performed by sensing drops in force with the force sensor. Moreover, in some embodiments, the sensor includes one or more hole detection sensors configured to sense holes in the web of packaging material, where detecting flaws in the web of packaging material includes detecting holes associated with the flaws and propagated based upon the controlled stretch applied to the web of packaging material using the one or more hole detection sensors. In addition, in some embodiments, the one or more hole detection sensors includes one or more ultrasonic sensors. Also, in some embodiments, the one or more hole detection sensors includes one or more optical sensors.

In some embodiments, the one or more hole detection sensors includes an array of hole detection sensors distributed across a width of the web of packaging material. In addition, in some embodiments, the one or more hole detection sensors includes an imaging device configured to capture images of the web of packaging material, and detecting holes associated with the flaws includes analyzing the captured images to identify holes in the web of packaging material. Also, in some embodiments, the body includes a take up drum, and the packaging material delivery system, the take up drum and the sensor are disposed in a test apparatus. In some embodiments, the take up drum is generally cylindrical. Moreover, in some embodiments, the body includes a load, and the packaging material delivery system and the sensor are disposed in a stretch wrapping machine.

Some embodiments may also include generating a notification to an operator in response to detecting a flaw in the roll of packaging material with the sensor. Also, in some embodiments, the notification alerts the operator that the roll of packaging material has excessive flaws. In addition, some embodiments may further include generating a chart of detected flaws to display occurrence, severity and length of packaging material at which detected flaws occur.

Consistent with another aspect of the invention, a method of controlling an apparatus to wrap a body with packaging material dispensed from a packaging material dispenser through relative rotation between the packaging material dispenser and the body may include sensing a packaging material hole during a wrap operation that wraps a body with packaging material as the packaging material is conveyed between a packaging material roll and the body by the packaging material dispenser using a sensor, and during the wrap operation and in response to sensing the indication using the sensor, temporarily increasing a dispense rate of the packaging material dispenser as the packaging material hole is conveyed to the body to reduce propagation of the packaging material hole and thereby avert a film break in the packaging material.

Some embodiments may further include, after temporarily increasing the dispense rate of the packaging material dispenser, restoring the dispense rate of the packaging material dispenser to an original value once the packaging material hole has been conveyed to the body. In addition, some embodiments may further include temporarily activating a roping mechanism in response to sensing the indication using the sensor. Further, in some embodiments, the body is a load.

In addition, in some embodiments, the sensor includes an ultrasonic sensor positioned with a field of view spanning at least a portion of a web of the packaging material between the packaging material roll and the body. Further, in some embodiments, the sensor includes an array of ultrasonic sensors positioned with fields of view collectively spanning at least a portion of a web of the packaging material between the packaging material roll and the body. In some embodiments, the sensor includes one or more optical sensors positioned with respective fields of view to collectively span at least a portion of a web of the packaging material between the packaging material roll and the body. In addition, in some embodiments, the sensor includes at least one force sensor configured to sense a tension of a web of the packaging material between the packaging material roll and the body. Moreover, in some embodiments, the force sensor is coupled to a driven or idle roller across which the web of packaging material is conveyed.

In addition, in some embodiments, the sensor includes a conductive hole sensor positioned proximate a conductive surface across which a web of the packaging material is conveyed between the packaging material roll and the body, where the conductive hole sensor includes a wiper mechanism positioned opposite the conductive surface and configured to ride along a surface of the web of packaging material and form an electrical coupling with the conductive surface through the packaging material hole. Moreover, in some embodiments, the conductive surface is disposed on a roller. Further, in some embodiments, the sensor is positioned downstream of a pre-stretch assembly of the packaging material dispenser. Also, in some embodiments, the sensor is positioned within a pre-stretch assembly of the packaging material dispenser. In addition, in some embodiments, the sensor is positioned upstream of a pre-stretch assembly of the packaging material dispenser.

Other embodiments may include a test apparatus comprising a packaging material delivery system configured to convey a web of packaging material from a packaging material roll to a take up drum to apply a controlled stretch to the packaging material prior to the packaging material being wrapped around the take up drum and configured to perform any of the aforementioned methods. Still other embodiments may include a load wrapping apparatus comprising a packaging material delivery system configured to convey a web of packaging material from a packaging material roll to a body comprising a load to apply a controlled stretch to the packaging material prior to the packaging material being wrapped around the load and configured to perform any of the aforementioned methods.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention.

DETAILED DESCRIPTION

Embodiments consistent with the invention may evaluate a packaging material to determine various metrics associated with the packaging material. A test apparatus may be used in some embodiments to evaluate packaging material using a take up drum or other body capable of sensing containment force imparted upon the drum or body by packaging material applied thereto, and from which a metric referred to herein as specific containment force may be determined for the packaging material for use in comparing the packaging material's performance against other types of packaging materials and/or for choosing suitable operational settings for a load wrapping apparatus. In addition, in some embodiments simulated flaws may be formed in a web of packaging material to evaluate a packaging materials response to such flaws when under tension.

Prior to a further discussion of these techniques, however, a brief discussion of various types of wrapping apparatus within which packaging material evaluated utilizing the various techniques disclosed herein may be used is provided.

Wrapping Apparatus Configurations

Figure 1:
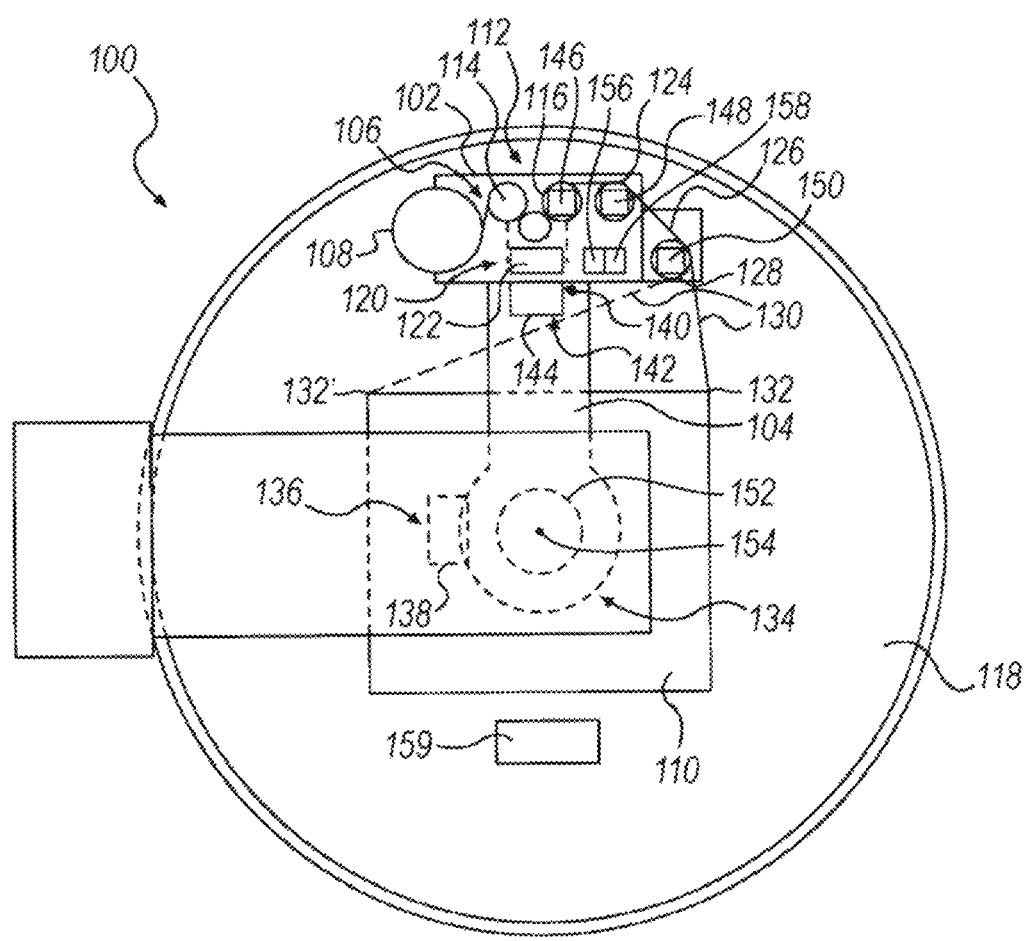
FIG. 1 shows a top view of a rotating arm-type wrapping apparatus consistent with the invention.

Packaging material evaluated using the various techniques described herein may be used in connection with various wrapping apparatus configurations. For example, FIG. 1 illustrates a rotating arm-type wrapping apparatus 100, which includes a roll carriage or elevator 102 mounted on a rotating arm 104. Roll carriage 102 may include a packaging material dispenser 106, which may also be referred to herein as a package material or film delivery system, and which may be used to convey packaging material from a roll of packaging material to a body, e.g., a load. Packaging material dispenser 106 may be configured to dispense packaging material 108 as rotating arm 104 rotates relative to a load 110 to be wrapped. In an example embodiment, packaging material dispenser 106 may be configured to dispense stretch wrap packaging material. As used herein, stretch wrap packaging material is defined as material having a high yield coefficient to allow the material a large amount of stretch during wrapping. However, it is possible that the apparatuses and methods disclosed herein may be practiced with packaging material that will not be pre-stretched prior to application to the load. Examples of such packaging material include netting, strapping, banding, tape, etc. The invention is therefore not limited to use with stretch wrap packaging material. In addition, as used herein, the terms "packaging material," "web," "film," "film web," and "packaging material web" may be used interchangeably. Moreover, the breakage of any of the aforementioned types of packaging materials will hereinafter be referred to as "film breaks," so the term should not be interpreted to imply that film breaks refer only to breakages occurring in film-type packaging material webs.

Packaging material dispenser 106 may include a pre-stretch assembly 112 configured to pre-stretch packaging material before it is applied to load 110 if pre-stretching is desired, or to dispense packaging material to load 110 without pre-stretching. Pre-stretch assembly 112 may include at least one packaging material dispensing roller, including, for example, an upstream dispensing roller 114 and a downstream dispensing roller 116. It is contemplated that pre-stretch assembly 112 may include various configurations and numbers of pre-stretch rollers, drive or driven roller and idle rollers without departing from the spirit and scope of the invention.

The terms "upstream" and "downstream," as used in this application, are intended to define positions and movement relative to the direction of flow of packaging material 108 as it moves from packaging material dispenser 106 to load 110. Movement of an object toward packaging material dispenser 106, away from load 110, and thus, against the direction of flow of packaging material 108, may be defined as "upstream." Similarly, movement of an object away from packaging material dispenser 106, toward load 110, and thus, with the flow of packaging material 108, may be defined as "downstream." Also, positions relative to load 110 (or a load support surface 118) and packaging material dispenser 106 may be described relative to the direction of packaging material flow. For example, when two pre-stretch rollers are present, the pre-stretch roller closer to packaging material dispenser 106 may be characterized as the "upstream" roller and the pre-stretch roller closer to load 110 (or load support 118) and further from packaging material dispenser 106 may be characterized as the "downstream" roller.

A packaging material drive system 120, including, for example, an electric motor 122, may be used to drive dispensing rollers 114 and 116. For example, electric motor 122 may rotate downstream dispensing roller 116. Downstream dispensing roller 116 may be operatively coupled to upstream dispensing roller 114 by a chain and sprocket assembly, such that upstream dispensing roller 114 may be driven in rotation by downstream dispensing roller 116. Other connections may be used to drive upstream roller 114 or, alternatively, a separate drive (not shown) may be provided to drive upstream roller 114. Moreover, in some embodiments the roll of packaging material 108 may be undriven and may rotate freely, while in other embodiments the roll may be driven, e.g., by biasing a surface of the roll against upstream dispensing roller 114 or another driven roller, or by driving the roll directly.

Downstream of downstream dispensing roller 116 may be provided one or more idle rollers 124, 126 that redirect the web of packaging material, with the most downstream idle roller 126 effectively providing an exit point 128 from packaging material dispenser 102, such that a portion 130 of packaging material 108 extends between exit point 128 and a contact point 132 where the packaging material engages load 110 (or alternatively contact point 132' if load 110 is rotated in a counter-clockwise direction).

Wrapping apparatus 100 also includes a relative rotation assembly 134 configured to rotate rotating arm 104, and thus, packaging material dispenser 106 mounted thereon, relative to load 110 as load 110 is supported on load support surface 118. Relative rotation assembly 134 may include a rotational drive system 136, including, for example, an electric motor 138. It is contemplated that rotational drive system 136 and packaging material drive system 120 may run independently of one another. Thus, rotation of dispensing rollers 114 and 116 may be independent of the relative rotation of packaging material dispenser 106 relative to load 110. This independence allows a length of packaging material 108 to be dispensed per a portion of relative revolution that is neither predetermined nor constant. Rather, the length may be adjusted periodically or continuously based on changing conditions. In other embodiments, however, packaging material dispenser 106 may be driven proportionally to the relative rotation, or alternatively, tension in the packaging material extending between the packaging material dispenser and the load may be used to drive the packaging material dispenser.

Wrapping apparatus 100 may further include a lift assembly 140. Lift assembly 140 may be powered by a lift drive system 142, including, for example, an electric motor 144, that may be configured to move roll carriage 102 vertically relative to load 110. Lift drive system 142 may drive roll carriage 102, and thus packaging material dispenser 106, generally in a direction parallel to an axis of rotation between the packaging material dispenser 106 and load 110 and load support surface 118. For example, for wrapping apparatus 100, lift drive system 142 may drive roll carriage 102 and packaging material dispenser 106 upwards and downwards vertically on rotating arm 104 while roll carriage 102 and packaging material dispenser 106 are rotated about load 110 by rotational drive system 136, to wrap packaging material spirally about load 110.

One or more of downstream dispensing roller 116, idle roller 124 and idle roller 126 may include a corresponding sensor 146, 148, 150 to monitor rotation of the respective roller. In particular, rollers 116, 124 and/or 126, and/or packaging material 108 dispensed thereby, may be used to monitor a dispense rate of packaging material dispenser 106, e.g., by monitoring the rotational speed of rollers 116, 124 and/or 126, the number of rotations undergone by such rollers, the amount and/or speed of packaging material dispensed by such rollers, and/or one or more performance parameters indicative of the operating state of packaging material drive system 120, including, for example, a speed of packaging material drive system 120. The monitored characteristics may also provide an indication of the amount of packaging material 108 being dispensed and wrapped onto load 110. In addition, in some embodiments a sensor, e.g., sensor 148 or 150, may be used to detect a flaw or break in the packaging material.

Wrapping apparatus also includes an angle sensor 152 for determining an angular relationship between load 110 and packaging material dispenser 106 about a center of rotation 154. Angle sensor 152 may be implemented, for example, as a rotary encoder, or alternatively, using any number of alternate sensors or sensor arrays capable of providing an indication of the angular relationship and distinguishing from among multiple angles throughout the relative rotation, e.g., an array of proximity switches, optical encoders, magnetic encoders, electrical sensors, mechanical sensors, photodetectors, motion sensors, etc. The angular relationship may be represented in some embodiments in terms of degrees or fractions of degrees, while in other embodiments a lower resolution may be adequate. It will also be appreciated that an angle sensor may also be disposed in other locations on wrapping apparatus 100, e.g., about the periphery or mounted on arm 104 or roll carriage 102. In addition, in some embodiments angular relationship may be represented and/or measured in units of time, based upon a known rotational speed of the load relative to the packaging material dispenser, from which a time to complete a full revolution may be derived such that segments of the revolution time would correspond to particular angular relationships. Other sensors may also be used to determine the height and/or other dimensions of a load, among other information.

Additional sensors, such as a load distance sensor 156 and/or a film angle sensor 158, may also be provided on wrapping apparatus 100. Load distance sensor 156 may be used to measure a distance from a reference point to a surface of load 110 as the load rotates relative to packaging material dispenser 106 and thereby determine a cross-sectional dimension of the load at a predetermined angular position relative to the packaging material dispenser. In one embodiment, load distance sensor 156 measures distance along a radial from center of rotation 154, and based on the known, fixed distance between the sensor and the center of rotation, the dimension of the load may be determined by subtracting the sensed distance from this fixed distance. Sensor 156 may be implemented using various types of distance sensors, e.g., a photoeye, proximity detector, laser distance measurer, ultrasonic distance measurer, electronic rangefinder, and/or any other suitable distance measuring device.

Film angle sensor 158 may be used to determine a film angle for portion 130 of packaging material 108, which may be relative, for example, to a radial (not shown in FIG. 1) extending from center of rotation 154 to exit point 128 (although other reference lines may be used in the alternative). In one embodiment, film angle sensor 158 may be implemented using a distance sensor, e.g., a photoeye, proximity detector, laser distance measurer, ultrasonic distance measurer, electronic rangefinder, and/or any other suitable distance measuring device. In other embodiments, film angle sensor 158 may be implemented mechanically, e.g., using a cantilevered or rockered follower arm having a free end that rides along the surface of portion 130 of packaging material 108 such that movement of the follower arm tracks movement of the packaging material. In still other embodiments, a film angle sensor may be implemented by a force sensor that senses force changes resulting from movement of portion 130 through a range of film angles, or a sensor array (e.g., an image sensor) that is positioned above or below the plane of portion 130 to sense an edge of the packaging material.

In other embodiments, some or all of sensors 146, 148, 150, 152, 156, 158 may be omitted.

Wrapping apparatus 100 may also include additional components used in connection with other aspects of a wrapping operation. For example, a clamping device 159 may be used to grip the leading end of packaging material 108 between wrap operations or cycles. In addition, a conveyor (not shown) may be used to convey loads to and from wrapping apparatus 100. Other components commonly used on a wrapping apparatus will be appreciated by one of ordinary skill in the art having the benefit of the instant disclosure.

Figure 2:
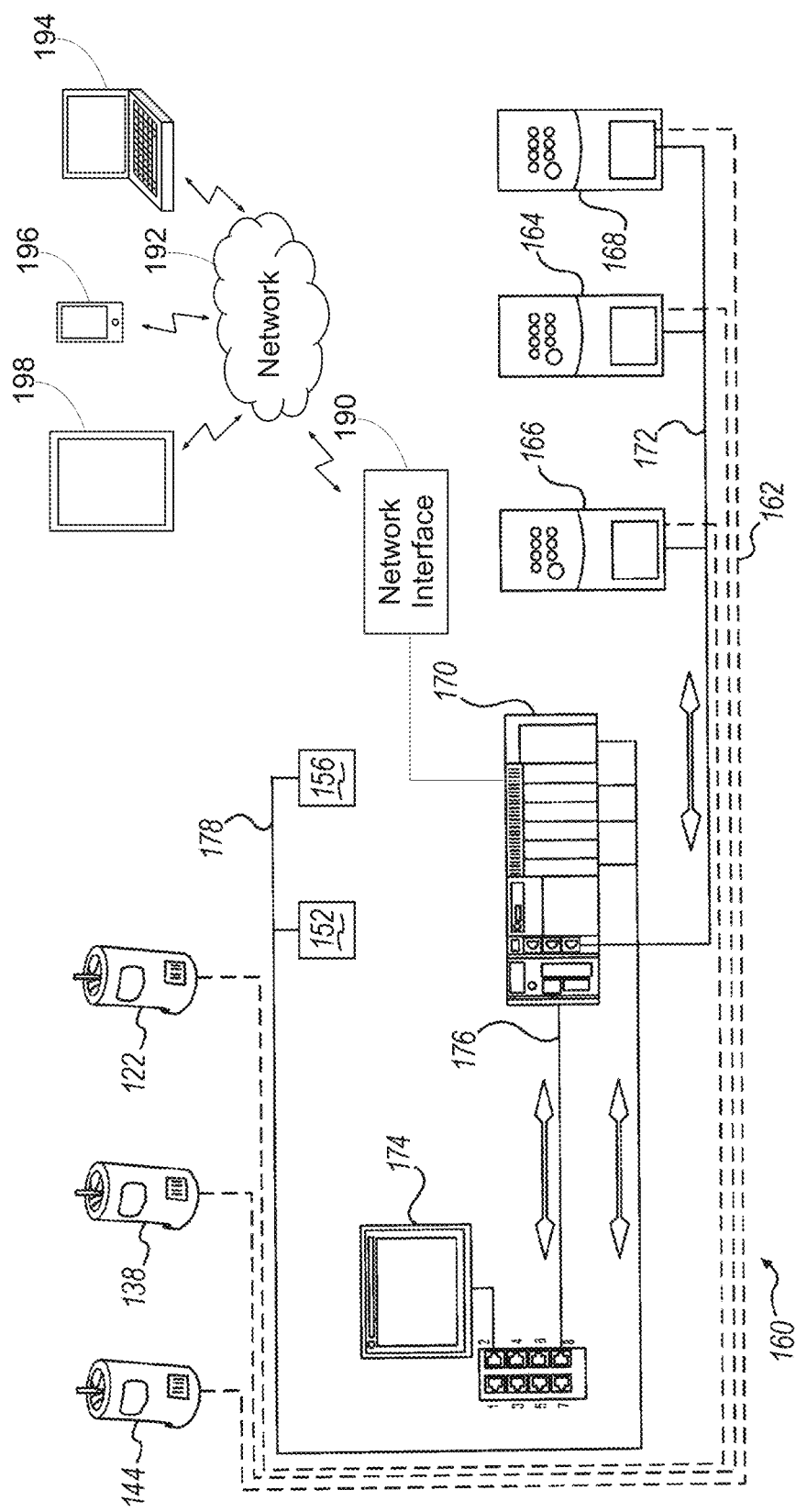
FIG. 2 is a schematic view of an example control system for use in the apparatus of FIG. 1.

An example schematic of a control system 160 for wrapping apparatus 100 is shown in FIG. 2. Control system 160 may also be suitable for use in other types of wrapping apparatus, e.g., wrapping apparatus 200 of FIG. 3 and wrapping apparatus 300 of FIG. 4, as well as some embodiments of a packaging material test apparatus 400 discussed in greater detail below in connection with FIG. 5. Motor 122 of packaging material drive system 120, motor 138 of rotational drive system 136, and motor 144 of lift drive system 142 may communicate through one or more data links 162 with a rotational drive variable frequency drive ("VFD") 164, a packaging material drive VFD 166, and a lift drive VFD 168, respectively. Rotational drive VFD 164, packaging material drive VFD 166, and lift drive VFD 168 may communicate with controller 170 through a data link 172. It should be understood that rotational drive VFD 164, packaging material drive VFD 166, and lift drive VFD 168 may produce outputs to controller 170 that controller 170 may use as indicators of rotational movement.

Controller 170 in the embodiment illustrated in FIG. 2 is a local controller that is physically co-located with the packaging material drive system 120, rotational drive system 136 and lift drive system 142. Controller 170 may include hardware components and/or software program code that allow it to receive, process, and transmit data. It is contemplated that controller 170 may be implemented as a programmable logic controller (PLC), or may otherwise operate similar to a processor in a computer system. Controller 170 may communicate with an operator interface 174 via a data link 176. Operator interface 174 may include a display or screen and controls that provide an operator with a way to monitor, program, and operate wrapping apparatus 100. For example, an operator may use operator interface 174 to enter or change predetermined and/or desired settings and values, or to start, stop, or pause the wrap operation. Controller 170 may also communicate with one or more sensors, e.g., sensors 152 and 156, among others, through a data link 178 to allow controller 170 to receive feedback and/or performance-related data during wrapping, such as roller and/or drive rotation speeds, load dimensional data, etc. It is contemplated that data links 162, 172, 176, and 178 may include any suitable wired and/or wireless communications media known in the art.

For the purposes of the invention, controller 170 may represent practically any type of computer, computer system, controller, logic controller, or other programmable electronic device, and may in some embodiments be implemented using one or more networked computers or other electronic devices, whether located locally or remotely with respect to the various drive systems 120, 136 and 142 of wrapping apparatus 100.

Controller 170 typically includes a central processing unit (CPU) including at least one microprocessor coupled to a memory, which may represent the random access memory (RAM) devices comprising the main storage of controller 170, as well as any supplemental levels of memory, e.g., cache memories, non-volatile or backup memories (e.g., programmable or flash memories), read-only memories, etc. In addition, the memory may be considered to include memory storage physically located elsewhere in controller 170, e.g., any cache memory in a processor in the CPU, as well as any storage capacity used as a virtual memory, e.g., as stored on a mass storage device or on another computer or electronic device coupled to controller 170. Controller 170 may also include one or more mass storage devices, e.g., a floppy or other removable disk drive, a hard disk drive, a direct access storage device (DASD), an optical drive (e.g., a CD drive, a DVD drive, etc.), and/or a tape drive, among others. Furthermore, controller 170 may include an interface 190 with one or more networks 192 (e.g., a LAN, a WAN, a wireless network, and/or the Internet, among others) to permit the communication of information to the components in wrapping apparatus 100 as well as with other computers and electronic devices, e.g. computers such as a desktop computer or laptop computer 194, mobile devices such as a mobile phone 196 or tablet 198, multi-user computers such as servers or cloud resources, etc. Controller 170 operates under the control of an operating system, kernel and/or firmware and executes or otherwise relies upon various computer software applications, components, programs, objects, modules, data structures, etc. Moreover, various applications, components, programs, objects, modules, etc. may also execute on one or more processors in another computer coupled to controller 170, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning controllers, computers and computer systems, those skilled in the art will appreciate that the various embodiments of the invention are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by controller 170. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

In the discussion hereinafter, the hardware and software used to control wrapping apparatus 100 is assumed to be incorporated wholly within components that are local to wrapping apparatus 100 illustrated in FIGS. 1-2, e.g., within components 162-178 described above. It will be appreciated, however, that in other embodiments, at least a portion of the functionality incorporated into a wrapping apparatus may be implemented in hardware and/or software that is external to the aforementioned components. For example, in some embodiments, some user interaction may be performed using an external device such as a networked computer or mobile device, with the external device converting user or other input into control variables that are used to control a wrapping operation. In other embodiments, user interaction may be implemented using a web-type interface, and the conversion of user input may be performed by a server or a local controller for the wrapping apparatus, and thus external to a networked computer or mobile device. In still other embodiments, a central server may be coupled to multiple wrapping stations to control the wrapping of loads at the different stations. As such, the operations of receiving user or other input, converting the input into control variables for controlling a wrap operation, initiating and implementing a wrap operation based upon the control variables, providing feedback to a user, etc., may be implemented by various local and/or remote components and combinations thereof in different embodiments. In some embodiments, for example, an external device such as a mobile device, a networked computer, a server, a cloud service, etc. may generate a wrap model that defines the control variables for controlling a wrap operation for a particular load, and that wrap model may then be communicated to a wrapping apparatus and used by a controller therefor to control a dispense rate during a wrap operation. As such, the invention is not limited to the particular allocation of functionality described herein.

Figure 3:
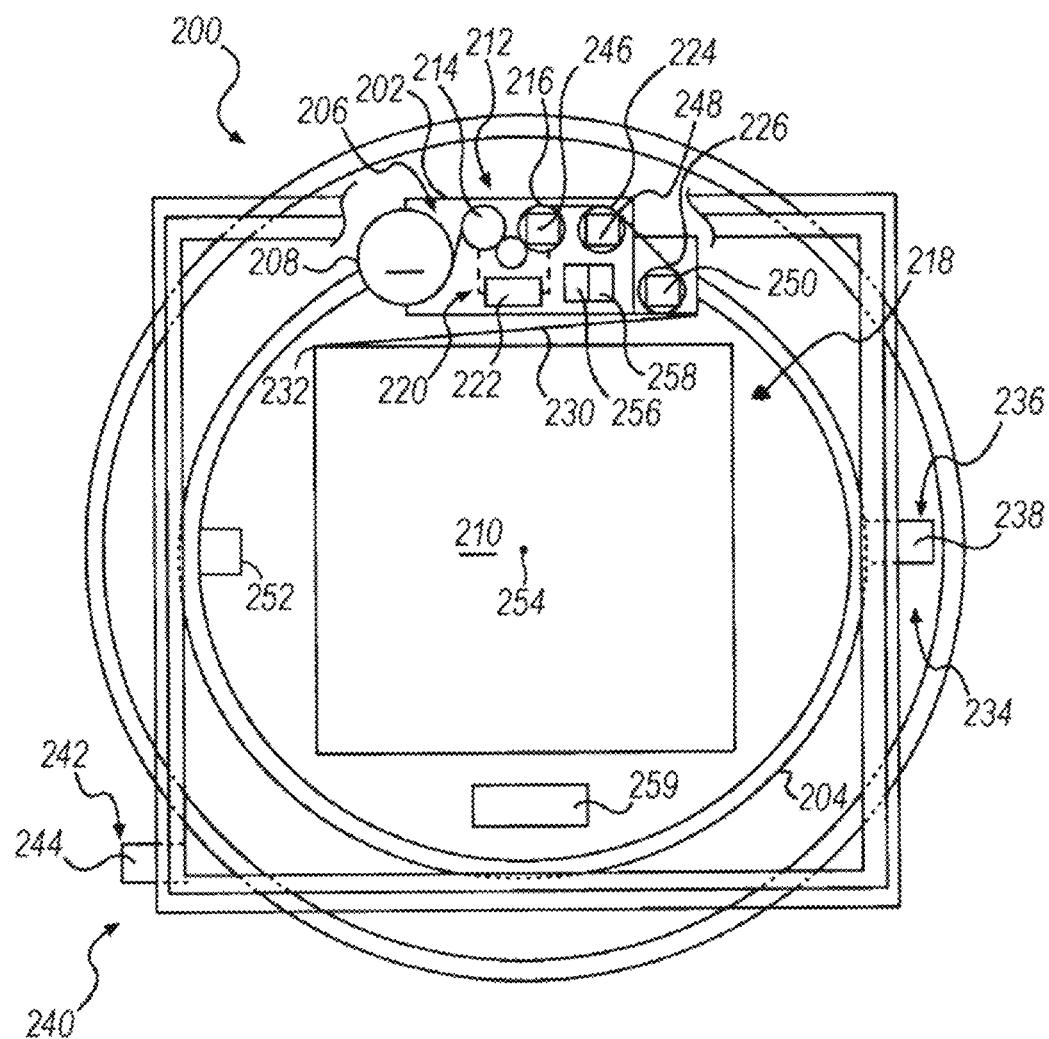
FIG. 3 shows a top view of a rotating ring-type wrapping apparatus consistent with the invention.

Now turning to FIG. 3, a rotating ring-type wrapping apparatus 200 is illustrated. Wrapping apparatus 200 may include elements similar to those shown in relation to wrapping apparatus 100 of FIG. 1, including, for example, a roll carriage or elevator 202 including a packaging material dispenser 206 configured to dispense packaging material 208 during relative rotation between roll carriage 202 and a load 210 disposed on a load support 218. However, a rotating ring 204 is used in wrapping apparatus 200 in place of rotating arm 104 of wrapping apparatus 100. In many other respects, however, wrapping apparatus 200 may operate in a manner similar to that described above with respect to wrapping apparatus 100.

Packaging material dispenser 206 may include a pre-stretch assembly 212 including an upstream dispensing roller 214 and a downstream dispensing roller 216, and a packaging material drive system 220, including, for example, an electric motor 222, may be used to drive dispensing rollers 214 and 216. Downstream of downstream dispensing roller 216 may be provided one or more idle rollers 224, 226, with the most downstream idle roller 226 effectively providing an exit point 228 from packaging material dispenser 206, such that a portion 230 of packaging material 208 extends between exit point 228 and a contact point 232 where the packaging material engages load 210.

Wrapping apparatus 200 also includes a relative rotation assembly 234 configured to rotate rotating ring 204, and thus, packaging material dispenser 206 mounted thereon, relative to load 210 as load 210 is supported on load support surface 218. Relative rotation assembly 234 may include a rotational drive system 236, including, for example, an electric motor 238. Wrapping apparatus 200 may further include a lift assembly 240, which may be powered by a lift drive system 242, including, for example, an electric motor 244, that may be configured to move rotating ring 204 and roll carriage 202 vertically relative to load 210.

In addition, similar to wrapping apparatus 100, wrapping apparatus 200 may include sensors 246, 248, 250 on one or more of downstream dispensing roller 216, idle roller 224 and idle roller 226. Furthermore, an angle sensor 252 may be provided for determining an angular relationship between load 210 and packaging material dispenser 206 about a center of rotation 254, and in some embodiments, one or both of a load distance sensor 256 and a film angle sensor 258 may also be provided. Sensor 252 may be positioned proximate center of rotation 254, or alternatively, may be positioned at other locations, such as proximate rotating ring 204. Wrapping apparatus 200 may also include additional components used in connection with other aspects of a wrapping operation, e.g., a clamping device 259 may be used to grip the leading end of packaging material 208 between cycles.

Figure 4:
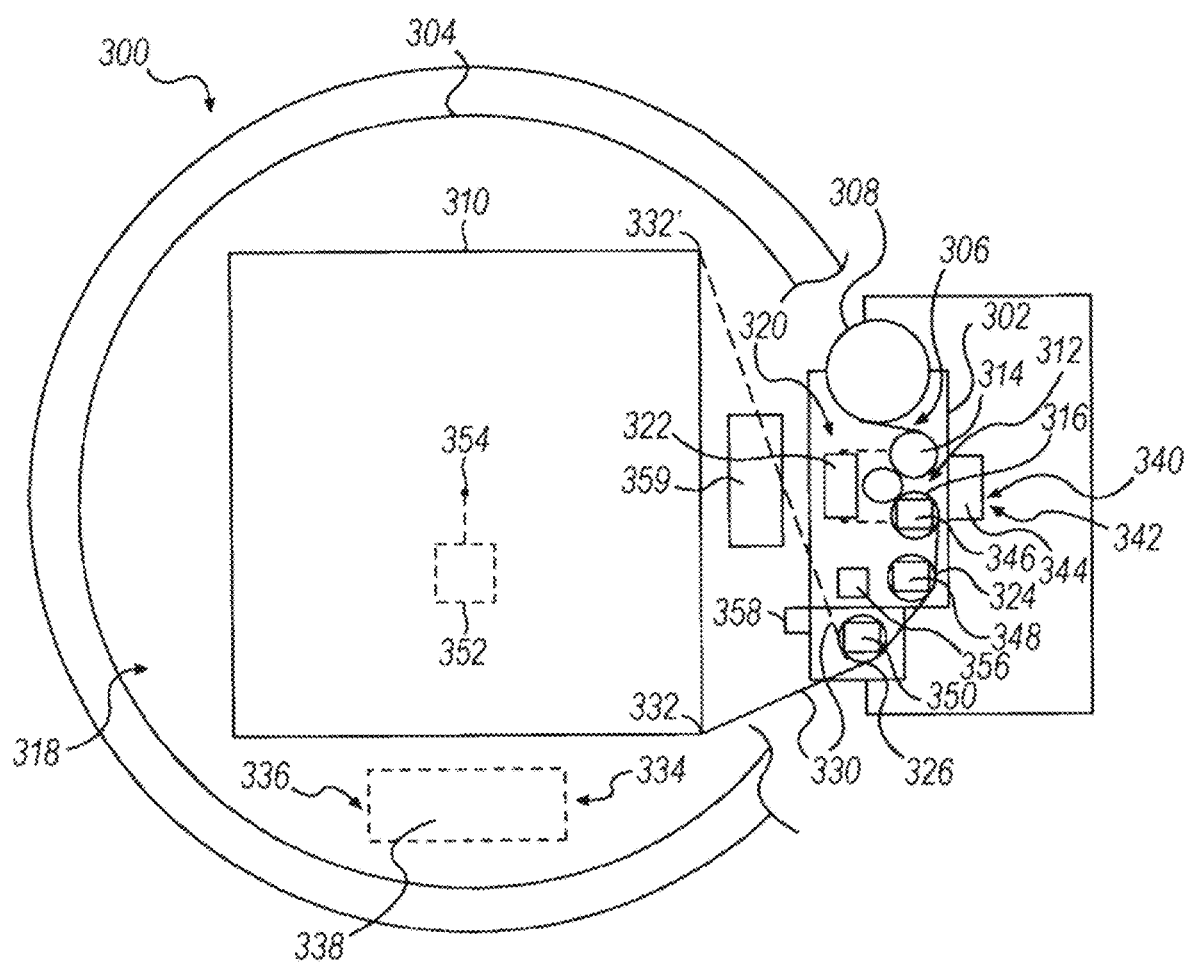
FIG. 4 shows a top view of a turntable-type wrapping apparatus consistent with the invention.

FIG. 4 likewise shows a turntable-type wrapping apparatus 300, which may also include elements similar to those shown in relation to wrapping apparatus 100 of FIG. 1. However, instead of a roll carriage or elevator 102 that rotates around a fixed load 110 using a rotating arm 104, as in FIG. 1, wrapping apparatus 300 includes a rotating turntable 304 functioning as a load support 318 and configured to rotate load 310 about a center of rotation 354 (through which projects an axis of rotation that is perpendicular to the view illustrated in FIG. 4) while a packaging material dispenser 306 disposed on a roll carriage or elevator 302 remains in a fixed location about center of rotation 354 while dispensing packaging material 308. In many other respects, however, wrapping apparatus 300 may operate in a manner similar to that described above with respect to wrapping apparatus 100.

Packaging material dispenser 306 may include a prestretch assembly 312 including an upstream dispensing roller 314 and a downstream dispensing roller 316, and a packaging material drive system 320, including, for example, an electric motor 322, may be used to drive dispensing rollers 314 and 316, and downstream of downstream dispensing roller 316 may be provided one or more idle rollers 324, 326, with the most downstream idle roller 326 effectively providing an exit point 328 from packaging material dispenser 306, such that a portion 330 of packaging material 308 extends between exit point 328 and a contact point 332 (or alternatively contact point 332' if load 310 is rotated in a counter-clockwise direction) where the packaging material engages load 310.

Wrapping apparatus 300 also includes a relative rotation assembly 334 configured to rotate turntable 304, and thus, load 310 supported thereon, relative to packaging material dispenser 306. Relative rotation assembly 334 may include a rotational drive system 336, including, for example, an electric motor 338. Wrapping apparatus 300 may further include a lift assembly 340, which may be powered by a lift drive system 342, including, for example, an electric motor 344, that may be configured to move roll carriage or elevator 302 and packaging material dispenser 306 vertically relative to load 310.

In addition, similar to wrapping apparatus 100, wrapping apparatus 300 may include sensors 346, 348, 350 on one or more of downstream dispensing roller 316, idle roller 324 and idle roller 326. Furthermore, an angle sensor 352 may be provided for determining an angular relationship between load 310 and packaging material dispenser 306 about a center of rotation 354, and in some embodiments, one or both of a load distance sensor 356 and a film angle sensor 358 may also be provided. Sensor 352 may be positioned proximate center of rotation 354, or alternatively, may be positioned at other locations, such as proximate the edge of turntable 304. Wrapping apparatus 300 may also include additional components used in connection with other aspects of a wrapping operation, e.g., a clamping device 359 may be used to grip the leading end of packaging material 308 between cycles.

Each of wrapping apparatus 200 of FIG. 3 and wrapping apparatus 300 of FIG. 4 may also include a controller (not shown) similar to controller 170 of FIG. 2, and receive signals from one or more of the aforementioned sensors and control packaging material drive system 220, 320 during relative rotation between load 210, 310 and packaging material dispenser 206, 306.

Those skilled in the art will recognize that the example environments illustrated in FIGS. 1-4 are not intended to limit the present invention. Indeed, those skilled in the art will recognize that other alternative environments may be used without departing from the scope of the invention.

Packaging Material Evaluation Test Apparatus

Packaging material for use in stretch wrapping machines and the like, as noted above, may be subject to film breaks for a variety of reasons. For example, film breaks may occur as a result of load and/or machine-related reasons, e.g., due to the inability of a stretch wrapping machine to provide a consistent wrap tension during wrapping devoid of film break inducing force spikes, or due to mechanical and/or control issues in automation components such as clamps, wipers, etc. Film breaks may also occur, however, due to flaws inherent due to manufacturing, storage, or transportation conditions in a packaging material that result in the generation of holes or tears in the packaging material as it is subject to wrap tension that would otherwise not cause film breaks in the absence of the flaws. The presence of flaws in packaging material, however, is to some extent unavoidable, and as such a wrapping apparatus may be expected to encounter at least some flaws in a packaging material without excessive numbers of film breaks. For the purposes of the invention, some flaws, which may be considered to be unavoidable and encountered on a relatively normal basis (e.g., small or medium-sized gels), may be considered to be "normal" flaws. More substantial flaws, e.g., larger gels, tears or other flaws, however, may be considered to be "exceptional," whereby film breaks caused by such exceptional flaws may be considered to be acceptable, as attempts to accommodate such comparatively more rare and significant flaws could otherwise decrease performance when wrapping with unflawed packaging material.

Choosing an ideal packaging material for use by a wrapping apparatus in a particular circumstance can be difficult. Packaging material quality can vary considerably between brands, models and even individual rolls of packaging material. While the ideal packaging material would be strong (and thus resistant to breakage), thin (and thus relatively light in weight), inexpensive, and free of flaws of any type, many packaging materials have been found to have differing characteristics in terms of one or more of strength, weight, cost and the presence of flaws.

Test apparatus have previously been developed to provide a "constantly replenished sample" using several individually controlled rollers to convey packaging material from a roll to a take up drum, along with one or more force sensors (e.g., coupled to idle or driven rollers) to generate a dynamic stress strain curve for the packaging material and/or to perform quality control testing on the packaging material. It has been found, however, that comparing different packaging materials using such test apparatus has been difficult because stress strain curves themselves generally are insufficient to reflect all of the characteristics of a packaging material that impact the ability of such packaging material to be used to wrap loads efficiently and effectively.

Embodiments consistent with the invention, on the other hand, provide an ability to evaluate a packaging material to develop a high level metric for a packaging material, in particular a metric generally related to an ability of a packaging material to provide a required containment force at a reasonable cost, and without an objectionable frequency of film breaks.

In some embodiments, for example, a test apparatus may be used that includes a generally cylindrical take up drum having an integrated capability to sense the containment force imparted upon the take up drum by packaging material, and from which an incremental containment force, related to the amount of containment force imparted upon the take up drum by a single layer of the packaging material (i.e., the amount of packaging material wrapped around the take up drum in a single revolution of the take up drum) may be determined. This incremental containment force may be compared against a cost or weight of the packaging material, e.g., by taking a ratio between the incremental containment force and a cost or weight of an amount of packaging material wrapped around the take up drum in a single revolution.

In some embodiments, for example, a take up drum may be generally cylindrical in shape to eliminate the impact of the corners of a load, and a packaging material delivery system may be used to eliminate the impact of dispenser variations, thereby enabling an amount of incremental containment force, whether instantaneous or after relaxation, to be measured for a particular type of packaging material by wrapping the packaging material about the take up drum while controlling the amount of stretch applied to the packaging material with the packaging material delivery system. The packaging material delivery system in some embodiments may emulate pre-stretch and/or post-stretch, with the former being the amount of stretch applied by a pre-stretch assembly between upstream and downstream pre-stretch rollers, and the latter being the amount of stretch applied between a packaging material dispenser and a load.

Figure 5:
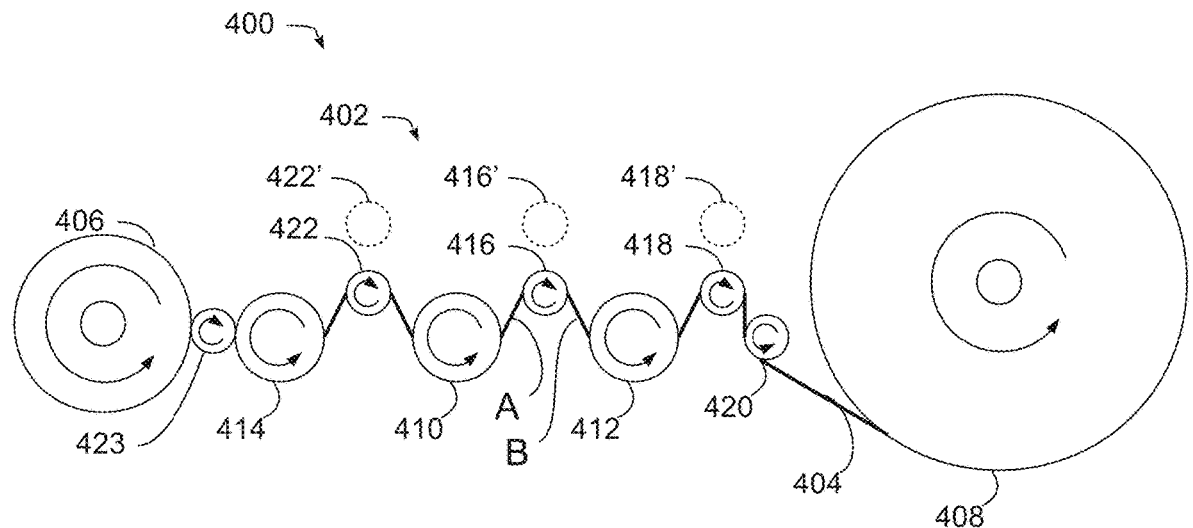
FIG. 5 functionally illustrates a test apparatus suitable for implementing packaging material evaluation consistent with the invention.

FIG. 5, for example, illustrates an example implementation of a test apparatus 400 including a packaging material delivery system 402 configured to convey a web of packaging material 404 from a packaging material roll 406 to a generally cylindrical take up drum 408. Packaging material delivery system 402 may include a pre-stretch assembly including an upstream pre-stretch roller 410 and a downstream pre-stretch roller 412, and in some implementations an additional intake roller 414 may be disposed upstream of upstream roller 410 to drive packaging material roll 406. In addition, various non-driven or idle rollers may be interposed between rollers 410, 412, 414 and take up drum 408, including a pre-stretch idle roller 416, exit idle rollers 418, 420, intake idle roller 422 and pinch roller 423. In addition, in some embodiments, it may be desirable to configure various rollers to be individually movable in a direction generally orthogonal to the rotational axes thereof, e.g., as represented by positions 416', 418' and 422' for idle rollers 416, 418 and 422. Doing so may enable different distances between rollers (and thus different lengths of unsupported packaging material) to be tested by test apparatus if desired, e.g., to evaluate how different unsupported lengths affect packaging material performance.

It is believed, for example, that the distance between upstream pre-stretch roller 410 and pre-stretch idle roller 416 (labeled "A" in FIG. 5) and/or the distance between pre-stretch idle roller 416 and downstream pre-stretch roller 412 (labeled "B" in FIG. 5) may impact a packaging material's resistance to flaws, and as such, it may be desirable in some embodiments to adjust one or both of these distances, optionally in combination with determining pre-stretch and/or post-stretch amounts, in order to determine optimum wrapper settings for a particular packaging material.

Figure 19:
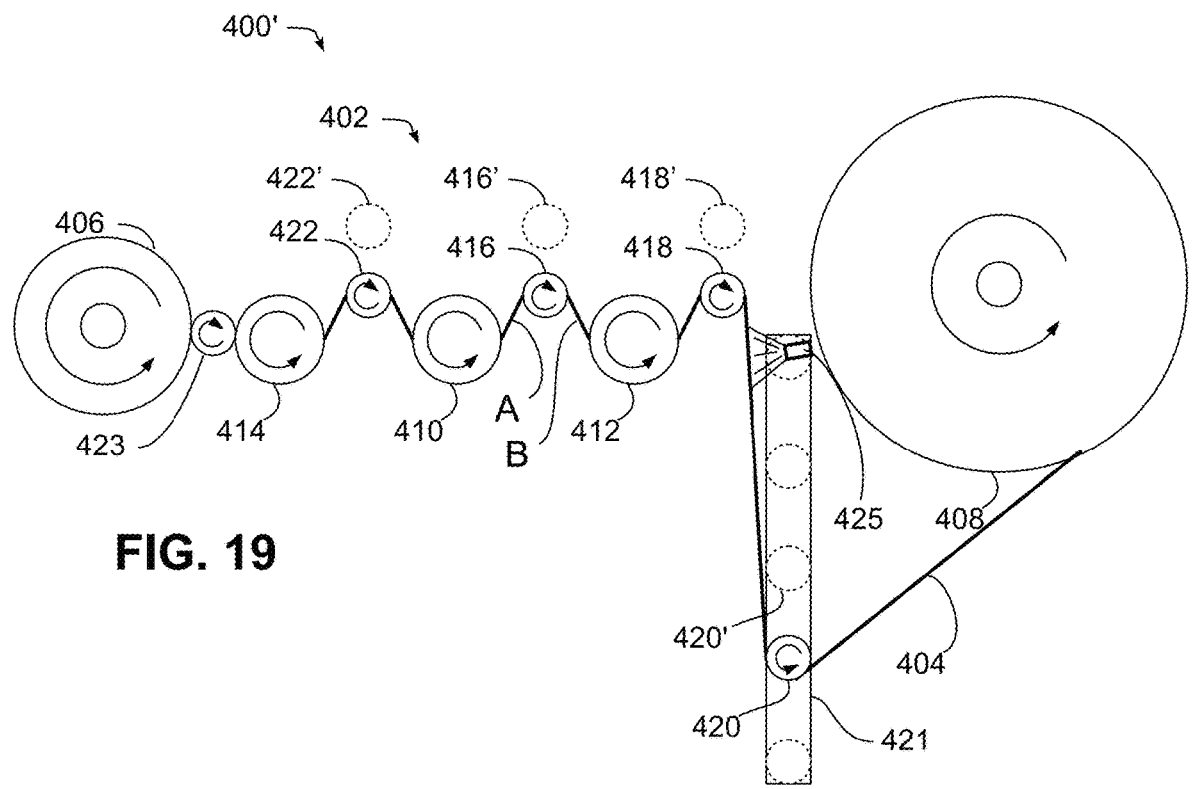
FIG. 19 functionally illustrates another test apparatus suitable for implementing packaging material evaluation consistent with the invention.

In addition, as illustrated by test apparatus 400' in FIG. 19, it may be desirable in some embodiments to mount idle roller 420 at one of a plurality of positions 420' along a support mechanism 421 to vary a length of unsupported packaging material between packaging material delivery system 402 and take up drum 408. By doing so, various lengths may be tested in different scenarios, and the lengths may in some embodiments be comparable to those seen in a typical load wrapping apparatus, thereby enabling testing to more closely approximate normal operating conditions for a load wrapping apparatus. Various manners of mounting idle roller 420 at different positions may be used in different embodiments. For example, assembly 421 may include a support mechanism incorporating a pair of opposing tracks with a plurality of opposing apertures disposed thereon to permit an idle roller to be secured at each end to the opposing tracks at varying distances along the tracks. As another example, opposing tracks may be provided with slots that run along the tracks are permit the idle roller to be positioned within a continuous range along the tracks. It will also be appreciated that the tracks may be removable or pivotable in some embodiments such that they may be moved out of the way when not needed. Other manners of supporting an idle roller at different positions to vary the length of unsupported packaging material between rollers, between a roller and a take up drum, or between a roller and a packaging material roll, may be used in other embodiments, and will be appreciated by those of ordinary skill having the benefit of the instant disclosure.

Figure 6:
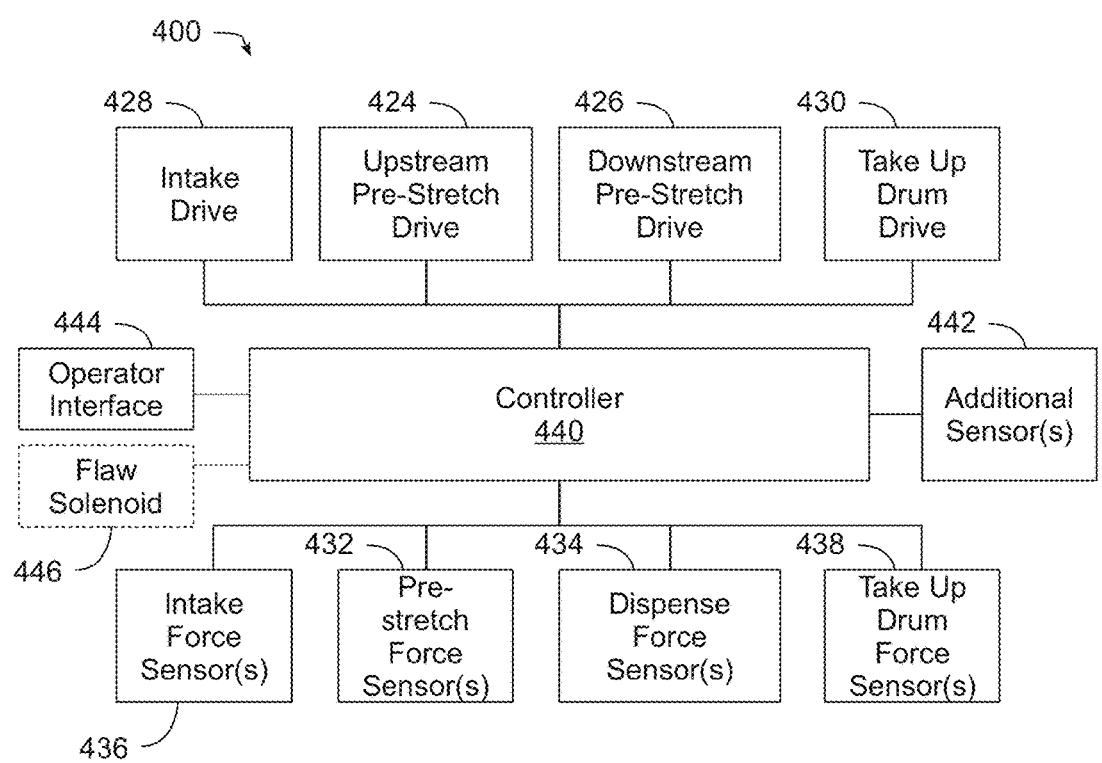
FIG. 6 is a block diagram of various electronic components in the test apparatus of FIG. 5.

Returning to FIG. 5, in the illustrated embodiments, rollers 410, 412, 414 and take up drum 408 are driven to provide controllable stretching of packaging material. With additional reference to FIG. 6, test apparatus 400 may also include a set of drives 424, 426, 428 and 430. Drives 424-430 may be, for example, servo motors (and may additionally include encoders and/or other angular position or rotation sensors), and may be respectively coupled to upstream pre-stretch roller 416, downstream pre-stretch roller 418, intake roller 422 and take up drum 408. Other types of drives, including, for example, DC motors, magnetic brakes, etc., may be used on any of drives 424-430. Further, in some embodiments, multiple rollers may be driven using a single drive, e.g., using a chain and sprocket, timing belt, etc. that can be manually modified to change a setting. Varying the rates of rotation of upstream and downstream pre-stretch drives 424, 426, for example, may be used to apply a controlled amount of pre-stretch, while varying the rates of rotation of downstream pre-stretch drive 426 and take up drum drive 430 may be used to apply a controlled amount of post-stretch, thereby simulating the amount of tension between a packaging material dispenser and a load during relative rotation between the packaging material dispenser and the load in a wrapping apparatus. The rates of rotation of upstream pre-stretch drive 424 and intake drive 428 may also be varied in some embodiments to simulate the resistance of the roll of packaging material, while in other embodiments the rates of rotation of drives 424 and 428 may be matched to reduce or mitigate packaging material roll effects. It will also be appreciated that while rollers 410, 412 and 414 are illustrated in FIG. 5 with the same diameters, rollers 410, 412 and 414 may have different diameters in other embodiments and thus the relative diameters of the rollers may also be addressed when controlling the rate of rotations of drives 424-430 when applying a controlled amount of stretch to the web of packaging material.

Test apparatus 400 may also include various force sensors to measure the force applied to the web of packaging material. For example, one or more force sensors such as load cells may be coupled to each of pre-stretch idle roller 416 (pre-stretch force sensor 432), one or both of exit idle rollers 418, 420 (dispense force sensor 434), and intake idle roller 422 (intake force sensor 436). In addition, as will become more apparent below, take up drum 408 may include one or more take up drum force sensors 438 that are configured to measure the containment force applied by the web of packaging material to take up drum 408. Multiple force sensors may be used for each roller and/or for take up drum 408, for example, to enable differentials in forces along the rotational axes thereof to be measured. In some embodiments, for example, such differentials may be usable to detect the relative locations of flaws across the width of the packaging material web.

Each of drives 424-430 and sensors 432-438 may be coupled to a controller 440, and moreover, various additional sensors 442, e.g., one or more image sensors, ultrasonic sensors, etc., may also be coupled to controller 440 to sense other aspects of test apparatus 400. For example, one or more image sensors, e.g., high speed cameras, may be directed to capture images of the web of packaging material at various points within test apparatus 400, e.g., on roll 406, on take up drum 408, on various rollers 410-423 and/or various points therebetween. Doing so, for example, may be useful for sensing flaws such as gels, tears, holes, etc. in the packaging material, for various reasons discussed in greater detail below.

Each drive 424-430 may also provide rotational or angular position data to controller 440, e.g., where each drive 424-430 is implemented as a servo motor with an integrated encoder functioning as a rotation or angular sensor. In other embodiments, however, separate rotation or angular sensors may be used for one or more of take up drum 408 and the various rollers described herein. Each rotation or angular sensor may be configured in some embodiments to measure an angular position of an associated component about a respective axis of rotation, which may also be used to detect or count full revolutions of the associated component, while in some embodiments one or more of the rotation or angular sensors may only be configured to detect or count full revolutions. For example, in some embodiments it may be desirable to mount a proximity switch on a frame of test apparatus 400 proximate take up drum 408 to detect a flag mounted at a predetermined angular position on take up drum 408 to detect each revolution of the take up drum, and thus each new layer of packaging material added to the take up drum during testing.

Test apparatus 400 may also include an operator interface 444 for use in setting up various control parameters for the apparatus, operating the apparatus, and retrieving test results therefrom. Operator interface may include various user input devices and/or displays coupled directly to test apparatus 400, or in some embodiments may be implemented on one or more remote computers or other devices in communication with test apparatus 400. In addition, in some embodiments, test apparatus 400 may also optionally include a mechanism for automatically creating simulated flaws in a packaging material. In some embodiments, for example, a hole punch may be mechanically coupled to a flaw solenoid 446 that, when actuated, strikes the roll of packaging material (or alternatively the web of packaging material) to form a flaw in the packaging material, e.g., on the surface of a roll or roller, in a span of a web between rollers, etc. In addition, while a simulated flaw may be formed via formation of a hole in some embodiments, in other embodiments other simulated flaws may be generated, e.g., via cutting or "snagging" the packaging material via a sharp instrument as the packaging material is conveyed past the simulated flaw mechanism. In addition, as discussed in greater detail below, in some embodiments a hole punch may rely on a pressurized fluid such as air rather than mechanical action, e.g., using a solenoid-actuated valve that regulates fluid flow from a high pressure fluid source to a nozzle disposed in close proximity to a web of packaging material.

Figure 7:
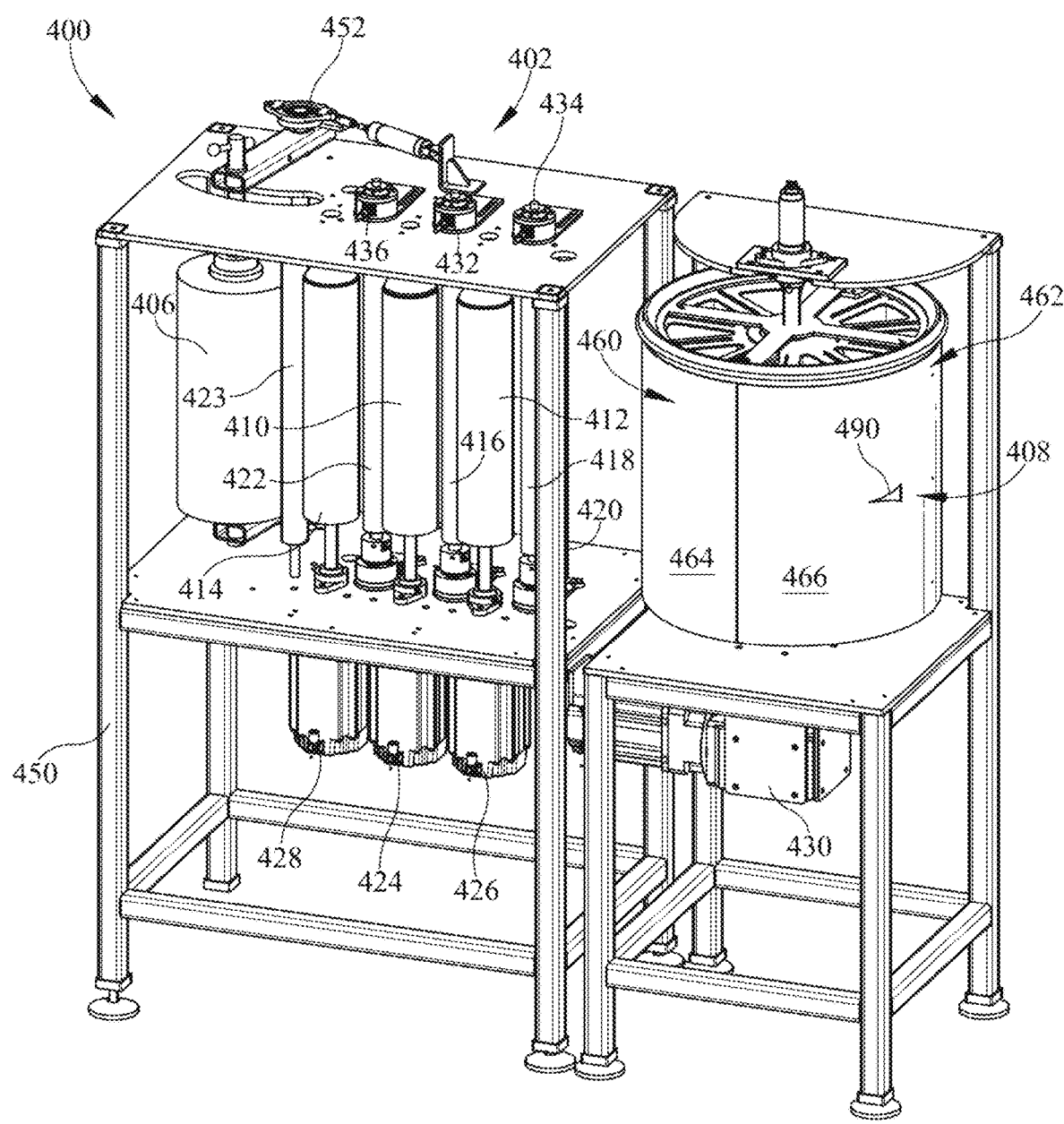
FIG. 7 is a perspective view of an example implementation of the test apparatus of FIG. 5.
Figure 8:
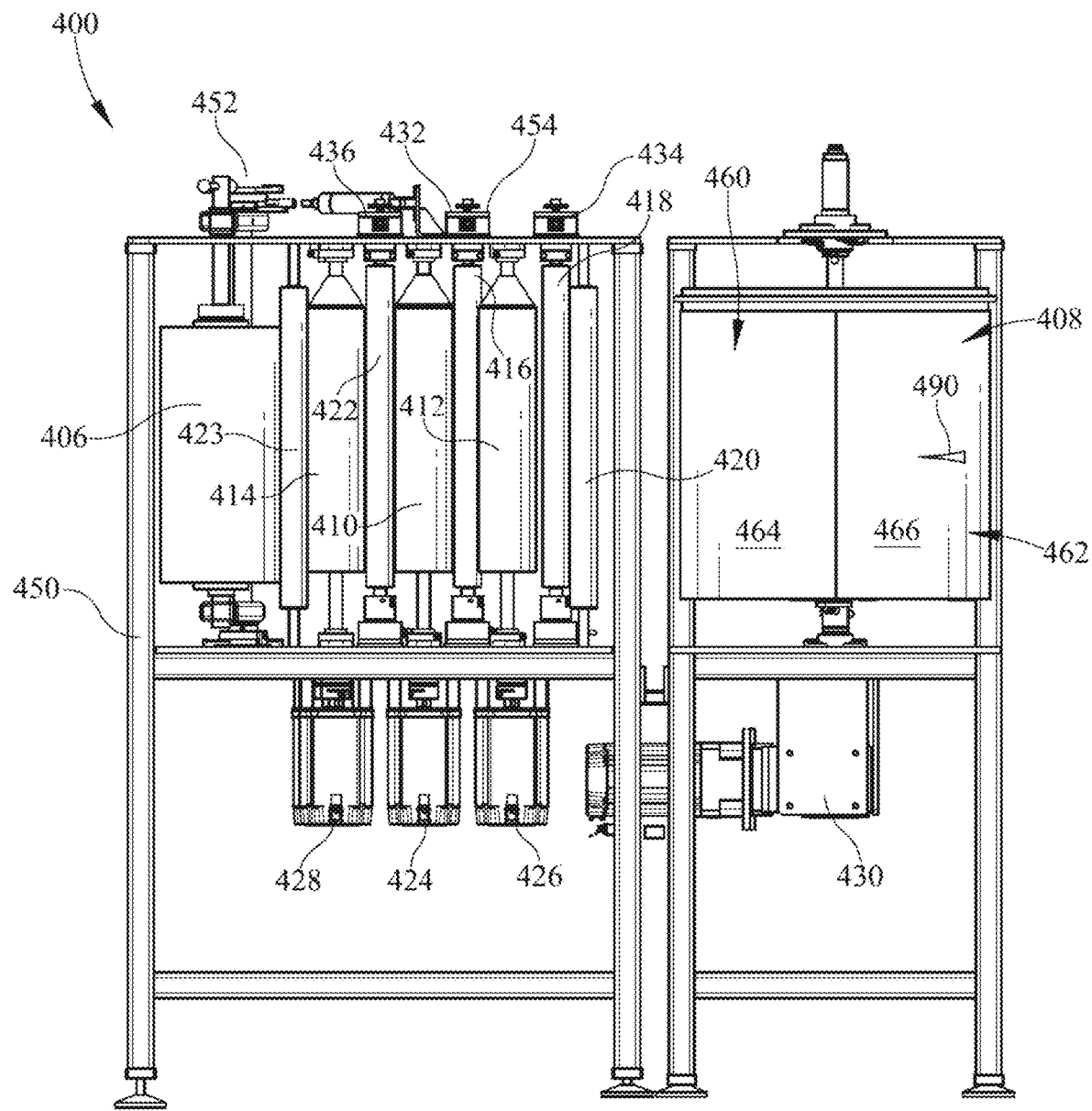
FIG. 8 is a front elevational view of the test apparatus of FIG. 5.
Figure 9:
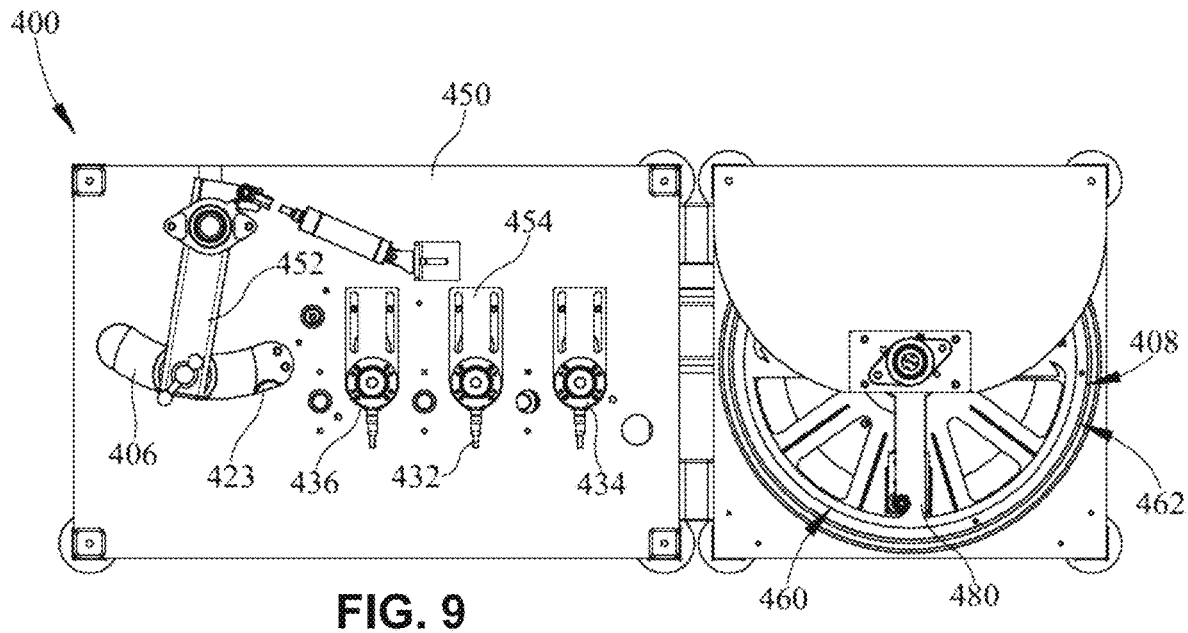
FIG. 9 is a top plan view of the test apparatus of FIG. 5.

FIGS. 7-9 illustrate one example implementation of test apparatus 400, where a frame 450 supports each of components 402-444 discussed above in connection with FIGS. 5-6. It may also be seen from these figures that various adjustment mechanisms, e.g., packaging material roll adjustment mechanism 452, and pre-stretch idle roller adjustment mechanism 454, may be used to adjust the relative positions of various components, e.g., packaging material roll 406 and pre-stretch idle roller 416. In some embodiments, adjustment mechanism 452 may also be biased (e.g., using one or more springs) to maintain contact between the surface of packaging material roll 406 and intake roller 414 and thereby enable rotation of intake roller 414 by intake drive 428 to drive packaging material roll 406 to dispense packaging material to packaging material delivery system 402.

As noted above, take up drum 408 in some embodiments may be generally cylindrical in some embodiments, and may further be configured to measure containment force applied to the take up drum by packaging material wrapped around the take up drum. In the illustrated embodiment, take up drum 408 is implemented as a split drum, and includes two drum members 460, 462 that respectively span first and second arcuate portions of the take up drum, e.g., approximately 180 degrees about the rotational axis each, and which rotate about a rotational axis R defined along a rotation shaft 464 that couples take up drum 408 to take up drum drive 430.

Each drum member 460, 462 includes a respective portion 464, 466 of a substantially cylindrical outer surface, and each includes a suitable support structure 468, 470 for the respective outer surface portion 464, 466. Each drum member 460, 462 also includes a respective first end 472, 474 and respective second end 476, 478 at which the drum members 460, 462 abut or mate with one another. While drum members 460, 462 are illustrated as spanning about 180 degrees arcuate portions of take up drum (where an arcuate portion is a portion of the circumference of the take up drum about the rotational axis of the drum), it will be appreciated that drum members may span different arcuate portions, and the more than two drum members may span the circumference of a take up drum in other embodiments.

To measure containment force imparted upon the drum by packaging material wound about the drum, one or more force sensors are positioned between the drum members 460, 462 to sense a compressive force imparted on the outer surface of the drum. As such, in some embodiments drum members 460, 462 may be configured to move relative to one another to compress the force sensor(s) 438 in response to the containment force imparted about the take up drum by the web of packaging material wound about the drum. In the illustrated embodiment, for example, and with further reference to FIG. 10, drum members 460, 462 may be pivotably coupled to one another proximate the first ends 472, 474 thereof through one or more hinges 480, with drum member 460 fixedly coupled to rotation shaft 464 and with drum member 462 pivotable about a pivot axis P defined by hinge 480 and substantially parallel to rotation axis R.

Proximate second ends 476, 478, one or more force sensors, e.g., load cells 482, 484, are disposed between drum members 460. For example, while other configurations, including an opposite configuration, may be used for each load cells, load cells 482, 484 may be mounted to drum member 462 proximate top and bottom ends of take up drum 408, and a pair of opposing surfaces 486, 488 may be defined on drum member 460 to engage each load cell 482, 484 when drum members 460, 462 are pivoted together into a wrapping configuration such as illustrated in FIGS. 7-9. By doing so, drum member 462 is pivoted towards drum member 460 and about hinge 480 in response to containment force imparted about take up drum 408 by the web of packaging material wound about the take up drum.

It will be appreciated that fewer or greater numbers of load cells or other force sensors may be used on take up drum to measure containment force, and that other configurations of force sensors may be used to sense the compression of the take up drum by the packaging material would about the drum. Furthermore, while drum members 460, 462 are illustrated as being pivotably connected to one another, drum members in other embodiments may be configured for other types of relative movement, e.g., linear or sliding movement. In addition, in some embodiments, no hinges may be used, e.g., where a drum is constructed of a pair of D-profile members or sections that are fastened together without hinges using four load cells (or more or less) at both ends of each section or member. It is believed, however, that the load cell arrangement illustrated herein may reduce the impact of centrifugal force on the load cells during testing. In addition, in some embodiments, a take up drum may include a force sensing surface material or other surface force sensing device such as a flap, probe, or panel instead of the illustrated arrangement of load cells. As another alternative, one or more load cells or force sensors coupled to the rotational shaft of the take up drum may be used to sense containment force. Other manners of sensing containment force on a take up drum will be appreciated by those of ordinary skill having the benefit of the instant disclosure.

Take up drum 408 may also include, in some embodiments, one or more bias members to bias the drum members 460, 462 into the wrapping configuration illustrated in FIGS. 7-9, e.g., one or more springs, pneumatic cylinders, elastic bands, etc. Moreover, take up drum 408 may also include one or more packaging material clamping mechanisms to hold a leading edge of the web of packaging material until at least one full layer of packaging material has been wrapped around the take up drum. In the illustrated embodiment, for example, one or more v-shaped slots 490 may be formed in outer surface portion 466 of drum member 462 and configured to receive a leading edge of a web of packaging material, with the apex of the V shape oriented to grab the packaging material upon counter-clockwise rotation of the take up drum 408 and pull the packaging material through packaging material delivery system 402.

Returning to FIG. 6, controller 440 may be configured to control the various illustrated components and record the outputs of the various sensors to evaluate a packaging material disposed on packaging material roll 406. For example, controller 440 may control upstream and downstream pre-stretch drives 424, 426 to control an amount of pre-stretch applied to the web of packaging material. The pre-stretch may be represented in some embodiments by a pre-stretch percentage (e.g., pre-stretch percentages of 200%-400%, or another suitable range of pre-stretch percentages), which represents the relative linear speeds of the surfaces of the upstream and downstream pre-stretch rollers 410, 412 (e.g., for pre-stretch rollers having the same diameters, a pre-stretch percentage of 200% would represent a relative rotation rate where downstream pre-stretch roller 412 rotated at a rate that was three times that of upstream-pre-stretch roller 410). In addition, controller 440 may control downstream pre-stretch drive 426 and take up drum drive 430 to control an amount of post-stretch applied to the web of packaging material between downstream pre-stretch roller 412 and take up drum 408. The post-stretch may also be considered to be a form of dispense rate (i.e., a rate at which packaging material is "dispensed" from the packaging material delivery system to the take up drum, which is analogous to the dispense rate at which packaging material is dispensed to a load during relative rotation between a packaging material dispenser and the load). The post-stretch or dispense rate may be represented in some embodiments as a payout percentage (e.g., payout percentages of 90%-120%, or another suitable range of pre-stretch percentages), which represents the relative linear speeds of the surfaces of the downstream pre-stretch roller 412 and take up drum 408 (e.g., a payout percentage of 90% would represent a relative rotation rate where downstream pre-stretch roller 412 rotated at a rate that provided a linear speed for its surface that was 90% of the linear speed for the take up drum). In other embodiments, however, post-stretch may be based upon a tension in the web of packaging material between the packaging material delivery system and the take up drum, e.g., to maintain a generally constant force sensed by a dispense force sensor(s) 434.

In addition, in some embodiments, it may be desirable to control one or both of downstream pre-stretch drive 426 and take up drum drive 430 to simulate winding of the web of packaging material around a rectangular load, and in some embodiments, a rectangular load having predetermined dimensions. It will be appreciated, for example, that the linear speed of the outer surface of take up drum 408 is related to the rate of rotation of the drum based upon the radius of the take up drum, e.g., using the known relationship between the radius and circumference of the take up drum ($c = 2\pi r$), and it will be appreciated from a review, for example, of U.S. Pat. No. 10,005,581, which is incorporated by reference herein, that a rectangular load of predetermined dimensions can be defined throughout relative rotation between the load and a packaging material dispenser by an effective circumference or effective radius of a tangent circle defined relative to the axis of rotation of the load and the web of packaging material extending between the load and the packaging material dispenser. Thus, by varying the rotation rates of one or more of take up drum drive 430, upstream pre-stretch drive 424 and downstream-pre-stretch drive 426, a rectangular load of predetermined dimensions may be simulated, as may various dispense rate controls that vary the dispense rate of a packaging material dispenser based upon effective dimensions of the load during relative revolution. In other embodiments, however, it may be desirable to evaluate packaging material without accounting for the shape of the load and/or a particular control methodology.

It may also be desirable in some embodiments to simulate different types of packaging material delivery systems through varying the relative rotation rates of one or more of the aforementioned drives. As noted elsewhere, for example, a tension-based drive system may be simulated by monitoring the force on a dispense force sensor. Likewise, delivery systems based upon dispensing a predetermined length of packaging material, or dispensing based upon the rate of rotation of an idle roller, may also be simulated with such a system, as may delivery systems based upon corner geometry and/or load dimensions, e.g., as discussed in the aforementioned '581 patent. Furthermore, it may also be desirable to simulate the sub-optimal performance of some packaging material delivery systems in order to simulate real-world conditions whereby spikes in wrap force occur proximate load corners (e.g., where a packaging material delivery system is out of synchronization with the relative rotation with the load). In some embodiments, for example, different wrap models may be developed to simulate different types of packaging material delivery systems, and a packaging material may be evaluated for different types of packaging material delivery systems to determine whether the packaging material is well suited for use with particular types of delivery systems. Thus, for example, it may be determined that a certain type of packaging material is best used with a tension-based load wrapping apparatus, but that other types of packaging material provide better performance for a load wrapping apparatus that dispenses predetermined lengths of packaging material during each revolution.

In some embodiments, various packaging material delivery systems may be simulated by mapping dispense and/or pre-stretch rates to take up drum rotation rate at different rotational positions of the take up drum and then utilizing such a mapping in the test apparatus when controlling the various drives. Mappings may also be generated to simulate sub-optimally calibrated packaging material delivery systems to enable a packaging material's performance in a load wrapping apparatus that is not optimally calibrated in the field to be evaluated.

Figure 10:
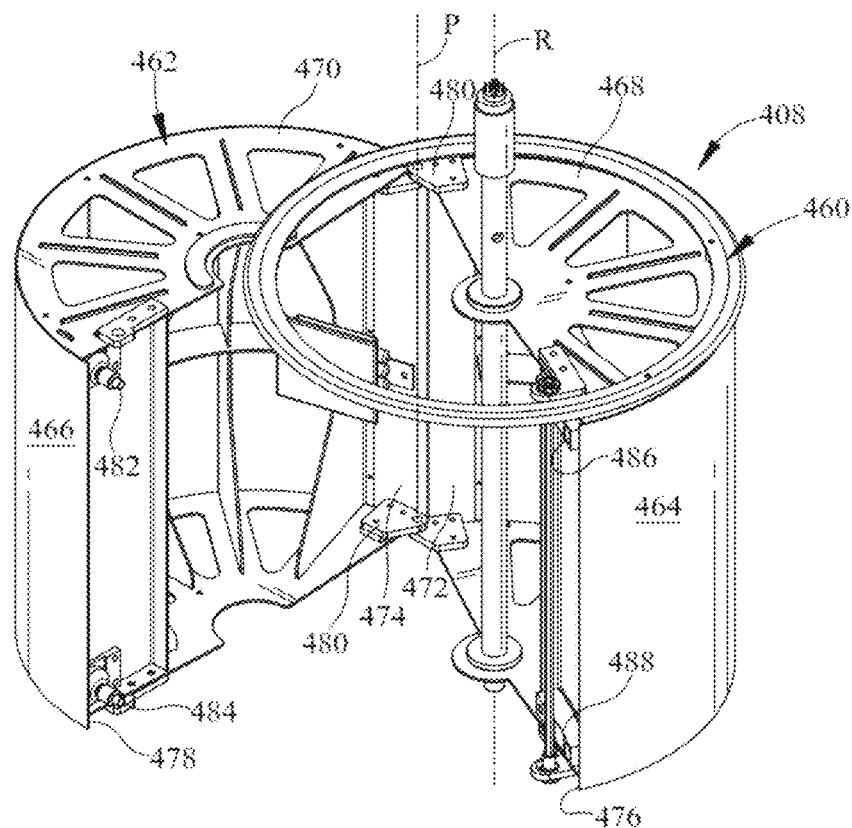
FIG. 10 is a perspective view of the take up drum of the test apparatus of FIGS. 7-9 in an opened configuration.

In addition, as discussed above, controller 440 is also configured to determine a containment force imparted on take up drum 408 by packaging material wound about the drum, e.g., by sensing the outputs of one or more of force sensors 438 (e.g., load cells 482, 484 of FIG. 10). The containment force may be determined based upon averaging the outputs of multiple force sensors, using a single force sensor, or through other mathematical processing of multiple force sensor outputs (e.g., based upon averages, minimums, maximums, etc. over a time frame, etc.).

It will also be appreciated that the containment force may also be measured over time, as packaging material may relax over time after being wound about the take out drum. As such, instantaneous containment force measured concurrent with wrapping packaging material about the drum may differ from containment force measured sometime thereafter due to relaxation effects (and which may be more reflective of the real world containment force applied by packaging material to a load during transport or storage of the load). It therefore may also be desirable in some embodiments to test characteristics of a packaging material before and/or after some relaxation. In some embodiments, for example, packaging material may be wrapped around a take up drum and then the drives of the test apparatus may be stopped while sensing by the force sensors is continued to enable relaxation of the packaging material over time to be sensed.

It may also be desirable in some embodiments to determine a stress strain curve for a packaging material after the packaging material has been pre-stretched. In order to do so, packaging material may be dispensed to take up drum 406 and then all drives may be stopped. Thereafter, the take up drum may be restarted and the outputs of the force sensors, and in particular the dispense force sensor(s) (and in some instances, the pre-stretch force sensor(s)), may be monitored along with the rotational position of the take up drum (e.g., using an encoder) to measure the amount of force and the length of stretch while the pre-stretch and intake drives are held in fixed positions, until the packaging material ultimately breaks. The stress strain may be tracked and may be tested for varying amounts of pre-stretch and/or payout in some embodiments.

Controller 440 may also determine an incremental containment force (ICF) per layer, representing an amount of containment force applied by a single layer of packaging material around the take up drum as a result of wrapping with the controlled amount of stretch (e.g., pre-stretch, post-stretch or both) applied to the packaging material. The ICF may be determined by monitoring the containment force during wrapping, determining a cumulative containment force after each layer is wrapped around the take up drum, and determining the additional or incremental containment force added by each layer. In some embodiments, for example, after one or more initial layers of packaging material have been wrapped around the take up drum, a starting containment force $C_S$ may be determined using load cells 482, 484, N numbers of additional layers of packaging material may be wrapped around the take up drum, and an ending containment force $C_E$ may be determined, whereby the ICF is equal to $(C_E-C_S)/N$. Other manners of deriving ICF from monitored containment force may be used in other embodiments, as will be appreciated by those of ordinary skill having the benefit of the instant disclosure. For example, in some embodiments, ICF values for each layer may be separately calculated (and if desired, averaged together), e.g., using the equation $ICF_i=C_i-C_{(i-1)}$ for the ICF for layer i.

Figure 11:
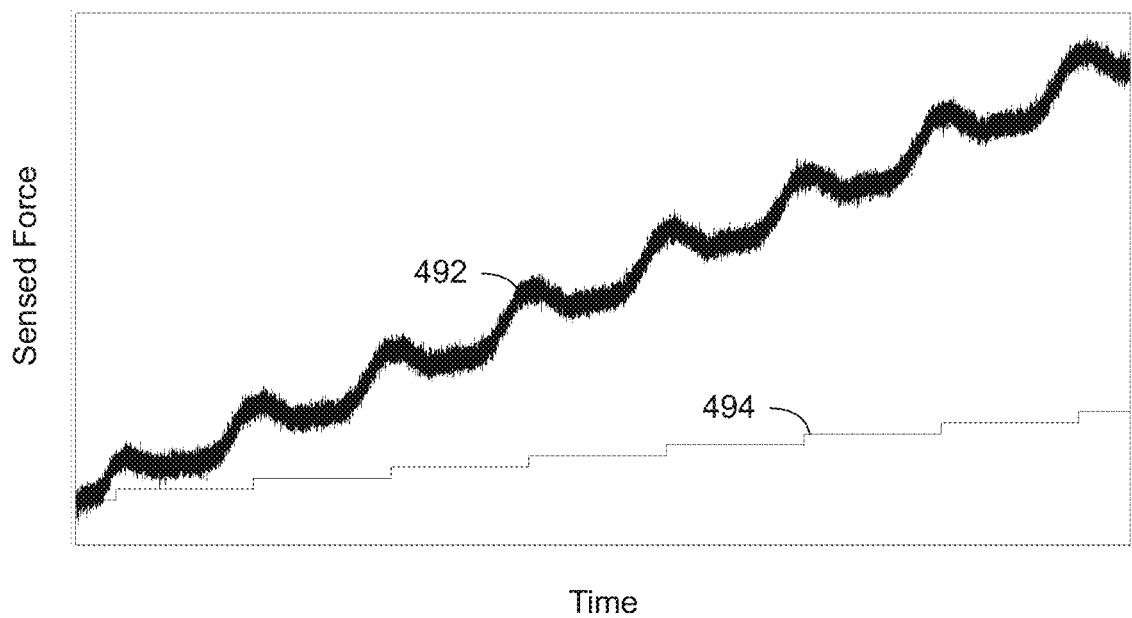
FIG. 11 is an example graph of containment force sensed by a load cell from the test apparatus of FIGS. 7-10 during wrapping of packaging material around the take up drum.

FIG. 11, for example, illustrates an example graph of the output of a load cell on a take up drum over time. Line 492, in particular, illustrates the force sensed by the load cells 482, 484 as packaging material is wrapped around a take up drum, while line 494 illustrates a layer count sensed, for example, by detecting a position flag mounted to the drum. It may be seen that with each new layer, the sensed force increases as additional containment force is applied to the take up drum, and due to relaxation in the packaging material over time, the sensed force can drop temporarily after an initial increase at the start of each new layer.

In some embodiments, ICF may be calculated by comparing (e.g., calculating the difference between) the load cell force value(s) for the take up drum at the start and end of each layer, with each new layer indicated by feedback from a proximity switch mounted to the test apparatus frame and a flag mounted to the rotating take up drum. Multiple ICF values calculated for each layer may then be averaged together to determine an ICF value for the packaging material at the selected controlled amount of stretch applied by the test apparatus. In other embodiments, ICF may be calculated by determining starting and ending forces at the beginning and end of multiple layers, and dividing the difference of those forces by the number of applied layers. Further, in some instances it may be desirable to allow the drives and the take up drum to be stopped in fixed positions and wait for a predetermined time (e.g., several seconds up to several minutes) to enable relaxation to occur in the packaging material on the take up drum, and then calculate the ICF after that time (optionally also tracking the force sensor readings over the time period to track the relaxation).

It will be appreciated that test apparatus 400 described herein may vary in other embodiments, e.g., by incorporating a take up drum that is non-cylindrical (e.g., rectangular in cross section and similar to a load, by utilizing other take up drum force sensing mechanisms, by modifying the packaging material delivery system to omit pre-stretch and/or an intake roller, by modifying the packaging material delivery system to include greater or fewer numbers of driven and/or idle rollers, by modifying the packaging material delivery system to utilize different combinations of force and/or non-force sensors, and in other manners that will be apparent to those of ordinary skill in the art having the benefit of the instant disclosure. Therefore the invention is not limited to the specific implementations described herein.

Specific Containment Force and Packaging Material Evaluation

Specific Containment Force (SCF) as used herein refers to a performance index that may be used in some embodiments to characterize a packaging material's ability to apply a given containment force per cost or weight of packaging material dispensed such that one or more load wrapping apparatus settings can be chosen to attempt to achieve the highest containment force at the lowest cost or amount of packaging material used. It will be appreciated that in general packaging material cost increases with increased thickness (and thus weight) for many types of packaging material, so in many instances weight is a reasonable proxy for cost, and thus SCF may be useful in some instances for optimizing packaging material performance both in terms of containment force and cost, or even to compare different types of packaging materials with one another.

In order to calculate a packaging material's SCF, the incremental containment force (ICF) per layer of packaging material applied to a rotating take up drum, e.g., take up drum 408 described above, is measured at a controlled amount of stretch, e.g., in the manner discussed above, and then a ratio is taken between the ICF and either the weight or cost per layer of the packaging material, e.g., by dividing the ICF by the weight or cost per layer of the packaging material.

The weight or cost per layer of packaging material applied to the drum may be calculated by scaling a weight or cost per unit length (e.g., per inch, cm, foot, etc.) by the amount of controlled stretch used when calculating the ICF. In some embodiments, for example, to determine a weight per unit length an un-stretched sample of a particular packaging material may be cut from the roll at a predetermined length (e.g., ten feet) and weighed. From this weight sample, the weight per layer of stretched packaging material applied to the take up drum may be calculated if the circumference of the take up drum and the ultimate stretch effect of both the pre-stretch and post-stretch settings are known. For example, where pre-stretch is X %, the post-stretch is Y % and the take up drum circumference is C, the length of packaging material applied per layer will be:

$$L = \frac{C}{1 + \frac{X\%}{100}} \times \left(1 + \frac{Y\% - 100}{100}\right)$$

In some embodiments, it may be desirable to calculate an SCF value for multiple pre-stretch and post-stretch settings corresponding to a normal operating range of a particular load wrapping apparatus. Moreover, one or more graphs, charts or other visualizations may be generated for different combinations of pre-stretch and post-stretch settings. In some embodiments, for example, SCF may be plotted across a range of post-stretch values while the pre-stretch value is held at a constant value. Multiple plots corresponding to different pre-stretch values may then be used to compare SCF throughout the operating range of a load wrapping apparatus.

Moreover, in order to select load wrapping apparatus operational settings that provide a desirable SCF value, it should also be appreciated that packaging material in most real world applications is flawed in such a way that it limits extreme pre-stretch and post-stretch settings, so while SCF values generally increase for unflawed packaging material with increased pre-stretch and/or post-stretch until the packaging material suffers a film break, flaws that regularly occur with varying frequency in different packaging materials would generally cause excessive numbers of film breaks at the maximum SCF values and corresponding operational settings used to achieve those SCF values when only considering unflawed packaging material.

Therefore, in order to provide a more useful assessment of how a packaging material would perform in read world situations, it may be desirable in some embodiments to evaluate a packaging material with simulated flaws incorporated into the packaging material being tested. In some embodiments, for example, in order to simulate flawed packaging material, a hammer-driven, hole-forming punch may be used to perforate a single hole located approximately at the center of a packaging material roll through multiple layers of packaging material on a roll. The punch size may be chosen to approximate typical flaws seen in packaging material, e.g., a punch having a diameter of 0.20 mm to 2.5 mm (³⁄₃₂ inch) may be used in some embodiments (for automated punch mechanisms, similar punch sizes—or nozzle sizes in the case of pneumatic punches—may also be used). The packaging material may then be fed through the test apparatus to test various combinations of pre-stretch and post-stretch values, e.g., by holding pre-stretch levels constant while increasing the amount of post-stretch and then recording the combined setting of pre-stretch and post-stretch values at which a packaging material breaks is recorded as a flaw failure point. This process may also be completed at multiple pre-stretch values to compare across the operating range of a load wrapping apparatus. It will also be appreciated that what constitutes a film break may vary in different embodiments, as some flaws will produce a true film break at a given setting while others will pass despite a significant flaw. Thus, in some instances, some degree of judgement may be used to classify what is a film break on a particular machine.

It will then be appreciated that the highest SCF value at which a packaging material can survive under flawed conditions can be selected from the combined SCF plot and flaw failure point. In some embodiments, for example, the flaw failure point at each pre-stretch value may be plotted on the same graph along with the SCF values over the range of post-stretch values for that same pre-stretch value, and thus, for any given pre-stretch value, an optimum post-stretch value to provide a maximum SCF value while being below the flaw failure point may be selected.

Figure 12:
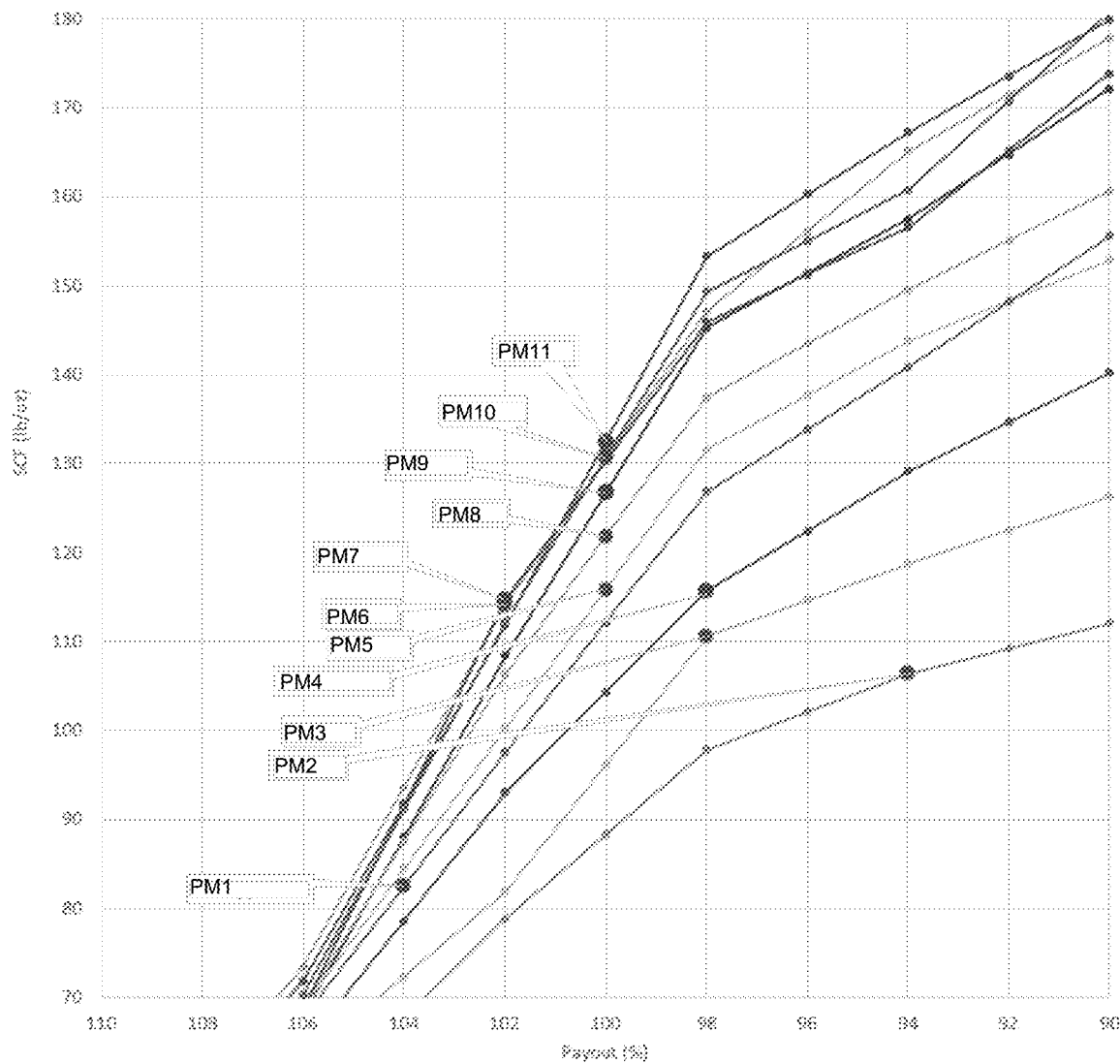
FIG. 12 is an example graph generated for an example sequence of operations for evaluating a packaging material using the test apparatus of FIGS. 7-10.

Testing may also be performed for multiple types, brands, models, etc. of packaging material in some embodiments, and the SCF values and flaw failure points for those various packaging materials may be plotted on the same graphs or charts to provide a comparative assessment of performance for different packaging materials. FIG. 12, for example, illustrates an example plot of SCF values and flaw failure points over a range of post-stretch values (payout percentages between 90 and 110%) for a single pre-stretch value (300%) for eleven different packaging materials identified as packaging materials PM1-PM11. The small dots and lines therebetween represent SCF values calculated over this range of post-stretch values for each packaging material, and the larger dots represent the flaw failure points for each packaging material. It will be appreciated that similar graphs may be generated for multiple pre-stretch values, and from these graphs, a packaging material having the highest SCF and the operational settings corresponding to that SCF may be determined. Thus, for example, if it is determined that a pre-stretch value of 300% is desired, the graph of FIG. 12 indicates that the highest SCF is provided by packaging material PM11, and that with a flaw failure point of 100% payout percentage, a reasonable resistance to film breaks is provided so long as the payout percentage is maintained above this point (i.e., where the amount of post-stretch is below this point since payout percentage decreases as the amount of post-stretch increased).

It will be appreciated that other manners of visualizing and comparing SCF and/or flaw failure points may be used in other embodiments. For example, the techniques described herein may be used to compare different pre-stretch values given a desired amount of post-stretch, and testing may also vary over a range of pre-stretch values for a constant amount of post-stretch. Moreover, where the amount of stretch is not broken into pre-stretch and pro-stretch amounts, SCF and flaw failure points may be based upon a range of controlled amounts of stretch.

Figure 13:
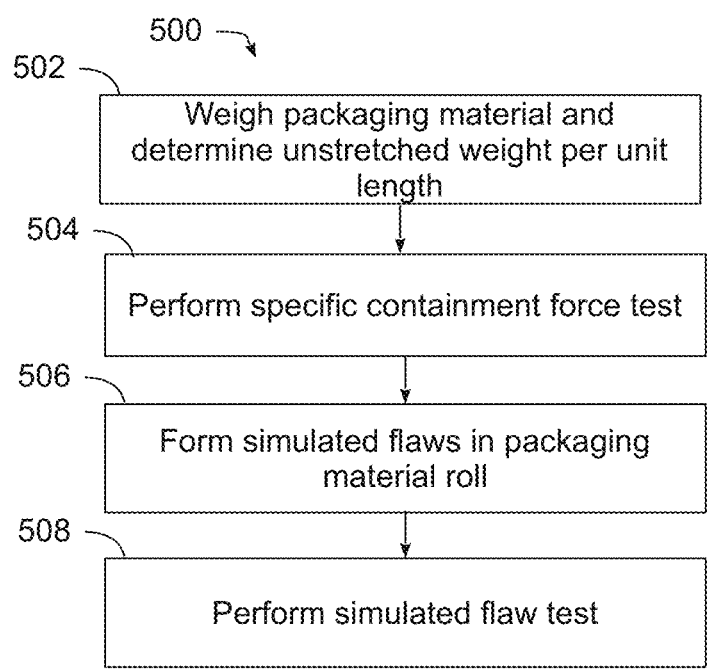
FIG. 13 is a flowchart illustrating an example sequence of operations for evaluating a packaging material using the test apparatus of FIGS. 7-10.
Figure 14:
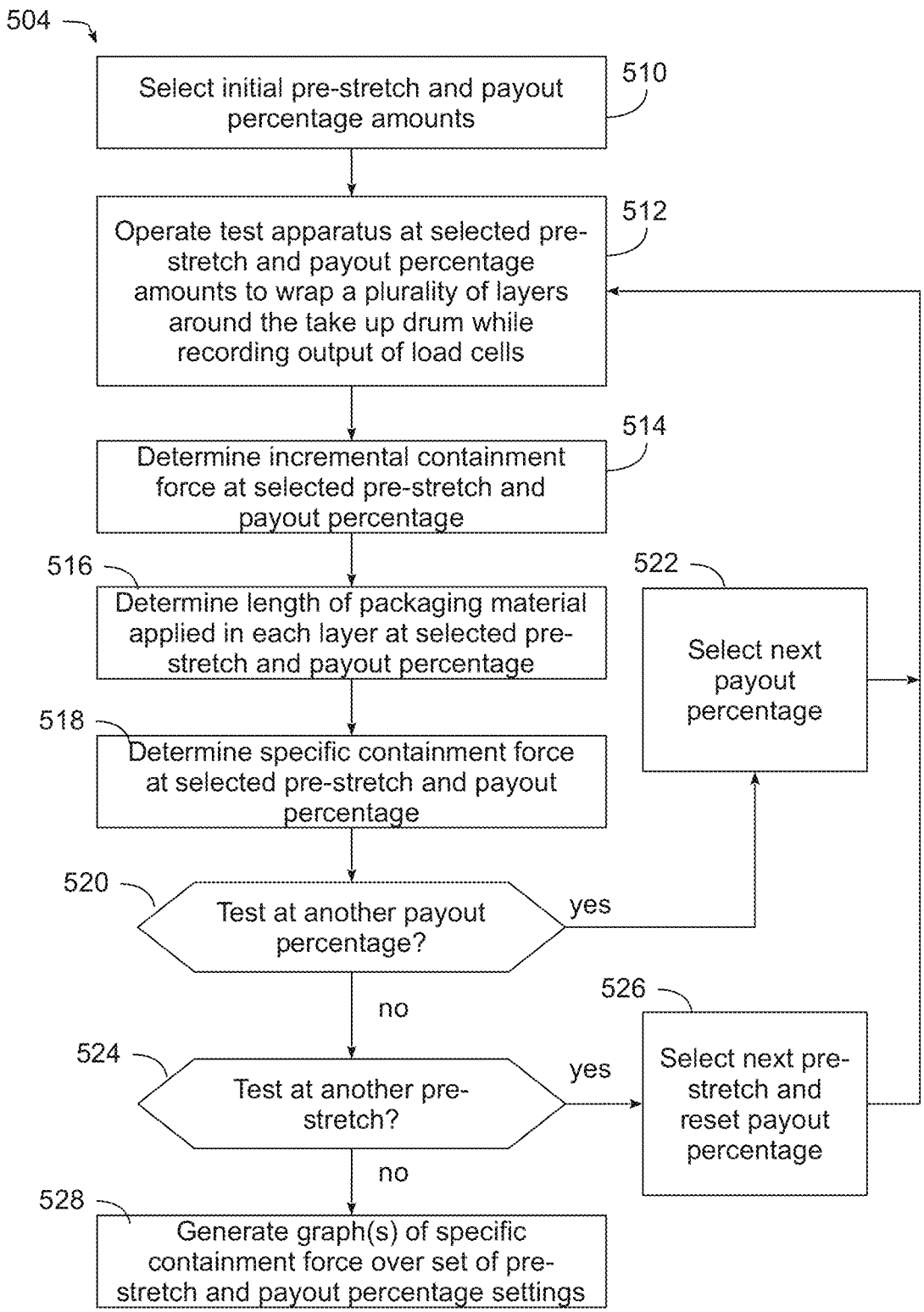
FIG. 14 is a flowchart illustrating an example sequence of operations for performing the specific containment force test referenced in FIG. 13.
Figure 15:
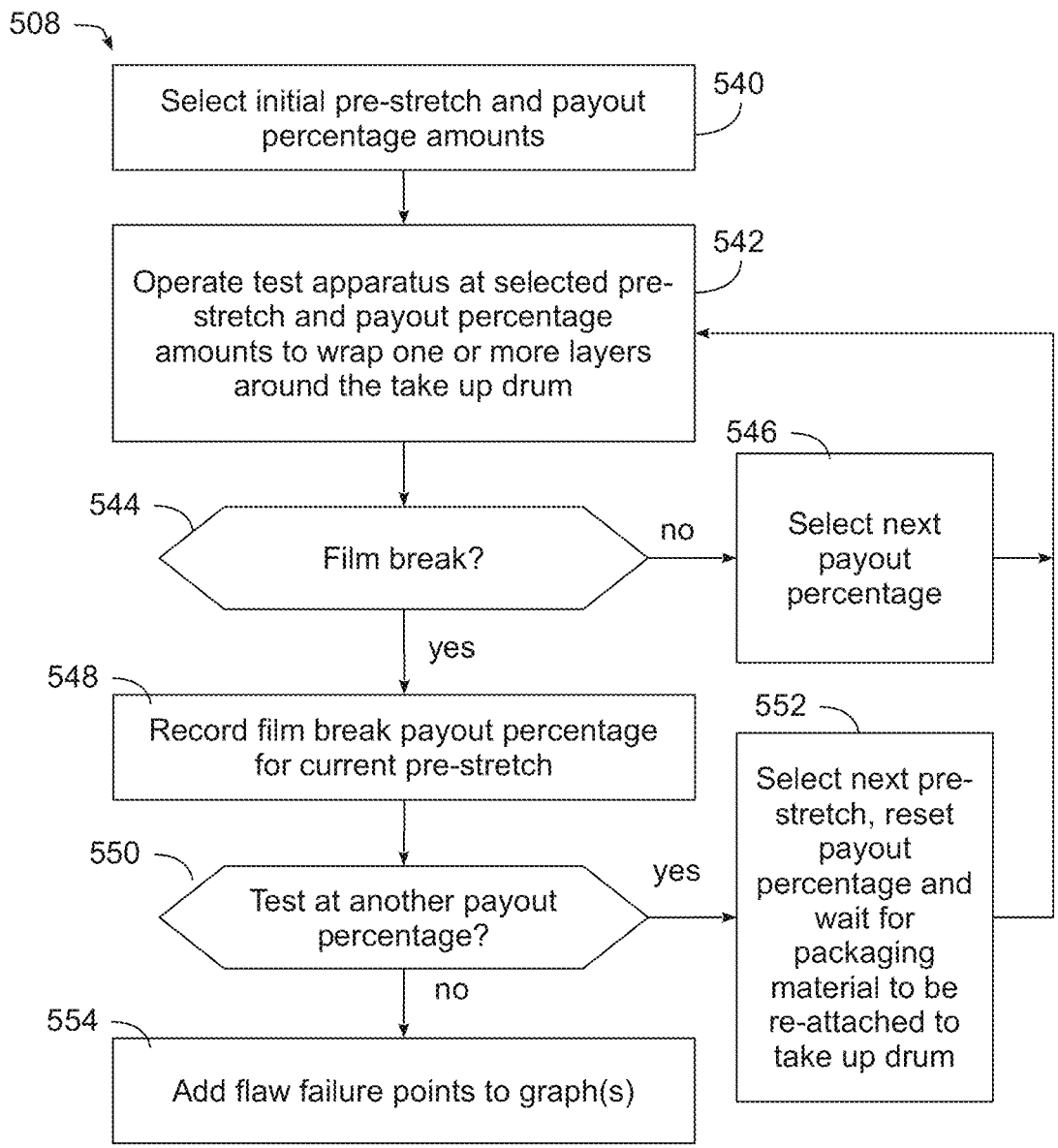
FIG. 15 is a flowchart illustrating an example sequence of operations for performing the simulated flaw test referenced in FIG. 13.

Now turning to FIGS. 13-15, an example sequence of operations for evaluating packaging material in a manner consistent with the invention is illustrated. As illustrated in FIG. 13, for example, a sequence of operations 500 for evaluating packaging material may begin in block 502 by weighing a predetermined length of unstretched packaging material and calculating therefrom a weight per unit length. For example, in some embodiments, a 10 foot length of packaging material may be cut from a packaging material roll and weighed, and the weight may be divided by 120 to generate a weight per inch for the packaging material.

Next, in block 504 a specific containment force test (described in greater detail below in connection with FIG. 14) may be performed to determine one or more specific containment forces for the packaging material. Thereafter, in block 506, simulated flaws may be formed in a roll of the packaging material, e.g., by striking the packaging material roll with a hole punch having a tip of about 0.2 mm to about 5 mm in diameter, or in some instances about 2.5 mm in diameter. In other embodiments, smaller or larger holes may be formed in a packaging material to represent different degrees of flaws. In the illustrated embodiment, however, a 2.5 mm hole may be considered to represent a "normal" flaw that a load wrapping apparatus should be expected to encounter during normal operation. Moreover, while simulated flaws may be generated manually in some embodiments, in other embodiments a test apparatus may include a mechanism capable of forming flaws in a roll or in a web of packaging material (e.g., a solenoid-actuated hole punch or air punch). In addition, it may be desirable to form smaller flaws for some testing purposes, e.g., using tool steel round blanks (or alternatively, wires or needles) ranging in size from about 0.35 mm to about 1.1 mm, which due to their size, do not need to be sharpened or hammer driven into a roll of packaging material, but may instead be used to pierce the packaging material by inserting the punch into the roll by hand and removing.

Once simulated flaws are formed in the packaging material roll, a simulated flaw test is then performed in block 508, in a manner that will be discussed in greater detail below in connection with FIG. 15. Based upon the testing performed in blocks 504 and 508, performance characteristics of the packaging material may be analyzed, e.g., to determine whether to use the packaging material, and if so, under what operating parameters a load wrapping apparatus should be operated when using the packaging material. In addition, in some embodiments the performance characteristics may be used to compare the packaging material against other types of packaging materials.

Now turning to FIG. 14, one example implementation of block 504 to perform a specific containment force test is illustrated. In block 510, initial pre-stretch and payout percentage amounts are selected. In some embodiments, for example, it may be desirable to test a packaging material over a typical range of pre-stretch and post-stretch (payout percentage) amounts used by a load wrapping apparatus, and starting initially with minimum amounts for both pre-stretch and post-stretch. Testing may then proceed by holding the pre-stretch amount steady while testing increasing amounts of post-stretch up to a maximum amount, then resetting the post-stretch and increasing the pre-stretch to a next amount, and repeating until the full range of pre-stretch and post-stretch amounts have been tested. Other sequences may be used in other embodiments, e.g., by testing increasing amounts of pre-stretch while holding post-stretch constant, by testing without separate pre-stretch and post-stretch, etc.

As such, in block 512, once the initial pre-stretch and post-stretch amounts are selected, the test apparatus is operated at the selected amounts to wrap a plurality of layers of packaging material around the take up drum. During this operation, the output(s) of the load cell(s) are recorded, and after a desired number of layers have been wrapped around the take up drum, block 514 determines an incremental containment force per layer at the selected pre-stretch and payout percentage amounts, e.g., by determining the containment force at the beginning and end of a set of layers and dividing by the number of layers in the set.

Next, in block 516 the length of unstretched packaging material applied to each layer in the set of layers is determined, based upon the circumference of the take up drum and the selected amounts of pre-stretch and payout percentage values. Then, in block 518 the specific containment force at the selected amounts of pre-stretch and payout percentage values is determined by dividing the determined incremental containment force by the cost or weight of the stretched packaging material used in each layer (e.g., determined by multiplying the cost or weight per unit length by the length of each layer unstretched packaging material).

Block 520 next determines if another payout percentage amount should be tested, and if so, control passes to block 522 to select the next payout percentage amount, and control returns to block 512 to operate the test apparatus at the same pre-stretch amount and the next payout percentage amount. If, however, every payout percentage amount has been tested for the current pre-stretch amount, block 520 instead passes control to block 524 to determine if another pre-stretch amount should be tested. If so, control passes to block 526 to select the next pre-stretch amount and reset the payout percentage amount to the initial (minimum) amount. Control then returns to block 512 to operate the test apparatus using the next pre-stretch amount and the reset payout percentage amount. If all pre-stretch amounts have been tested, however, control passes to block 528 to generate one or more graphs of specific containment force values over the tested range of pre-stretch and payout percentage amounts.

Now turning to FIG. 15, one example implementation of block 508 to perform a simulated flaw test is illustrated. The simulated flaw test is generally used to determine at what amount(s) of pre-stretch and/or payout percentage a simulated flaw formed in a packaging material exhibits a predetermined behavior. In the illustrated embodiment, the predetermined behavior is a film break where the web of packaging material is completely severed across its width. In other embodiments, however, other behaviors may be tested, e.g., when a flaw expands to a predetermined size or shape during pre-stretch and/or post-stretch, or on the surface of a roller, when the tension in a web of packaging material drops below a predetermined threshold, where a predetermined length of tear is formed in response to the flaw, where a predetermined shape or size of hole is formed in response to the flaw, or where a hole formed in response to the flaw propagates to a rope, or others that will be appreciated by those of ordinary skill in the art having the benefit of the instant disclosure.

In block 540, initial pre-stretch and payout percentage amounts are selected. In some embodiments, for example, it may be desirable to test a packaging material over a typical range of pre-stretch and post-stretch (payout percentage) amounts used by a load wrapping apparatus, and starting initially with minimum amounts for both pre-stretch and post-stretch. Testing may then proceed by holding the pre-stretch amount steady while testing increasing amounts of post-stretch up to the point where a film break or other behavior is encountered, then resetting the post-stretch and increasing the pre-stretch to a next amount, and repeating until the full range of pre-stretch and post-stretch amounts have been tested. Other sequences may be used in other embodiments, e.g., by testing increasing amounts of pre-stretch while holding post-stretch constant, by testing without separate pre-stretch and post-stretch, etc. In addition, various additional machine settings may be configurable, e.g., the overall speed of the machine.

As such, in block 542, once the initial pre-stretch and post-stretch amounts are selected, the test apparatus is operated at the selected amounts to wrap one or more layers of packaging material around the take up drum. During this operation, the output(s) of the load cell(s) may also be recorded, and after a desired number of layers have been wrapped around the take up drum, block 544 determines whether a film break has occurred (e.g., by detecting a sharp drop in force in one of the idle rollers in the packaging material delivery system). If not, control passes to block 546 to increase the payout percentage amount, and control then returns to block 542 to continue wrapping at the increased payout percentage amount. Thus, the payout percentage amount is progressively increased while holding the pre-stretch amount constant until the point at which the packaging material suffers a film break.

Once a film break occurs, block 544 passes control to block 548 to record the amount of payout percentage at which the film break occurs (i.e., the film break payout percentage). Block 550 then determines if additional pre-stretch amounts remain to be tested, and if so, passes control to block 552 to select the next pre-stretch amount, reset the payout percentage amount, and wait for the packaging material to be reattached to the take up drum. Control then returns to block 542 to operate the test apparatus using the new pre-stretch amount and reset payout percentage amount. Once all pre-stretch amounts have been tested, however, block 550 passes control to block 554 to add flaw failure points to the graph(s) generated in block 528 of FIG. 14. In some embodiments, the flaw failure points may be the payout percentages at which the film breaks occurred, while in other embodiments different points may be used, e.g., the last payout percentage tested prior to a film break occurring, the payout percentage amount at which the film break occurred scaled by a predetermined amount, etc.

Figure 16:
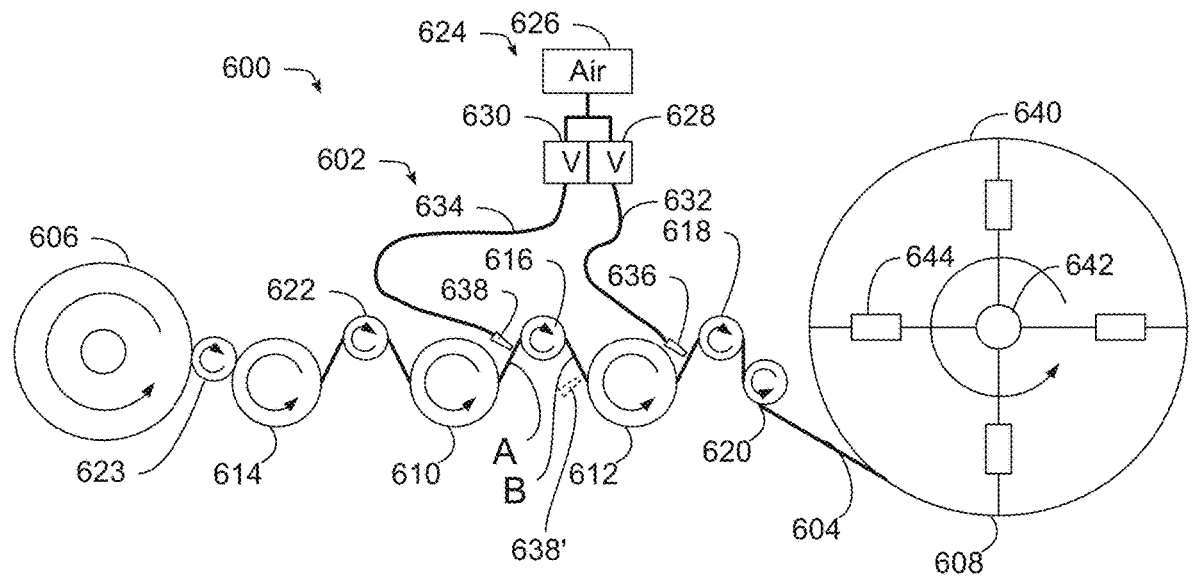
FIG. 16 functionally illustrates another test apparatus suitable for implementing packaging material evaluation consistent with the invention.
Figure 17:
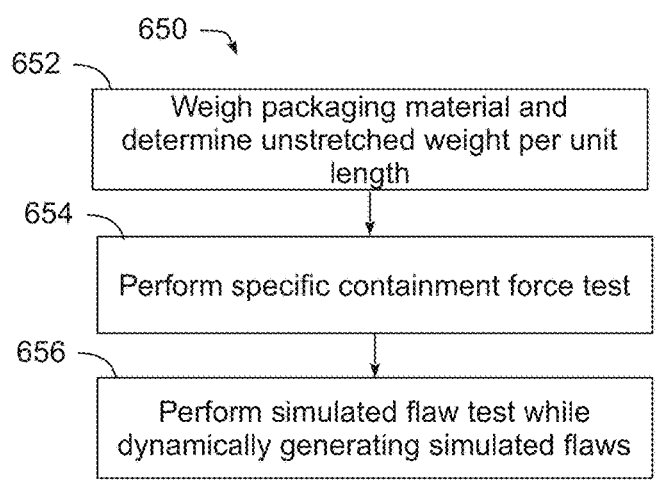
FIG. 17 is a flowchart illustrating an example sequence of operations for evaluating a packaging material using the test apparatus of FIG. 16.

Now turning to FIGS. 16-17, another example test apparatus and method of evaluating packaging material is illustrated, utilizing a solenoid-driven hole punch to dynamically form simulated flaws in a web of packaging material during simulated flaw testing. As illustrated in FIG. 16, a test apparatus 600 may include a packaging material delivery system 602 configured to convey a web of packaging material 604 from a packaging material roll 606 to a generally cylindrical take up drum 608. Packaging material delivery system 602 may include a pre-stretch assembly including an upstream pre-stretch roller 610, a downstream pre-stretch roller 612, an intake roller 614 and idle rollers 616, 618, 620 and 622, all of which operate in a similar manner as corresponding components 402-423 of test apparatus 400 of FIG. 5, and it will be appreciated that operation of test apparatus 600 may be similar in many respects to test apparatus 400 of FIG. 5 as discussed above. In addition, test apparatus 600 includes a dynamic simulated flaw system 624 incorporating a source of pressurized fluid or air 626, solenoid-actuated valves 628, 630, pressurized lines 632, 634 and nozzles 636, 638.

Dynamic simulated flaw system 624 is configured to form simulated flaws in a web of packaging material using a stream or burst of highly pressurized fluid directed at the surface of the web of packaging material. In one embodiment, for example, nozzle 636 is disposed downstream of downstream pre-stretch roller 612 and directed proximate a lateral midpoint of the web of packaging material, generally with the nozzle tip disposed in close proximity to the web such that upon actuation of valve 628, a burst of pressurized air sufficient to form a hole is expelled from nozzle 636 and directed at the web of packaging material to puncture the surface of the packaging material. It will be appreciated that the orifice size of nozzle 636 may be selected to provide a desired size of hole, and nozzle 636 may be replaceable with differently-sized nozzles, or a variable orifice size nozzle may be used in order to generate different sizes of holes (and thus less or more significant simulated flaws) as desired. In addition, the duration of a fluid burst may also be varied and/or modulated to vary the type of simulated flaw that is generated, e.g., to replicate a curring motion or generate a different shape of hole.

It will also be appreciated that simulated flaws may be formed in different regions of test apparatus 600, e.g., between pre-stretch rollers 610, 612 as is illustrated for nozzle 638 (on the "A" side of idle roller 616, or alternatively, as illustrated in phantom at 638', on the "B" side of idle roller 616). Other locations, e.g., on the surface of a driven or idle roller, on the surface of a packaging material roll, on unsupported lengths of packaging material between various rollers (e.g., near the take up roller, the upstream pre-stretch roller or the downstream pre-stretch roller), etc., may be used in other embodiments, and moreover, different lateral locations (e.g., points along the width of the web) may also be used in some embodiments, e.g., where it is desirable to evaluate simulated flaws occurring at different lateral positions on a packaging material web. Further, while two nozzles 636, 638 and associated valves 628, 630 are illustrated in FIG. 16, in other embodiments only a single nozzle and valve may be used, while in still other embodiments additional nozzles and/or valves may be used (e.g., to support simulated flaw formation at multiple points in test apparatus 600 and/or multiple lateral positions on a packaging material web). In addition, in some embodiments, rather than using a source of pressurized fluid or air to dynamically form simulated flaws, mechanical punches, e.g., solenoid-actuated punches, pins or hammers may be used in a dynamic simulated flaw system consistent with the invention to physically strike and puncture a packaging material.

In some embodiments, it may be desirable to form simulated flaws downstream of downstream pre-stretch roller 612 (i.e., downstream of the pre-stretch zone or region of packaging material delivery system 602), as it has been found that naturally-occurring flaws (e.g., gels) in some packaging material rolls do not appreciably propagate within a pre-stretch region of a packaging material delivery system, and only propagate downstream of the pre-stretch region. Thus, by simulating flaws from a position downstream of a pre-stretch region of a packaging material delivery system, the propagation of such simulated flaws due to tension in the web of packaging material may more closely match the response of naturally-occurring flaws in such packaging material rolls. However, simulated flaws may be formed in other locations as noted above (including for example within a pre-stretch region, or between the packaging material roll and the intake roller) so the invention is not limited to the formation of simulated flaws downstream of a pre-stretch region.

FIG. 16 also illustrates an alternate take up drum design 608, in which a single piece drum shell 640 is mounted to a rotational shaft 642 through a plurality of structural members 644. Force sensors 646, e.g., strain gauges, load cells, etc.) may be mounted to structural members 644 to sense the containment force imparted upon the take up drum shell 640 by packaging material wound about the take up drum. Where strain gauges are used for force sensors, structural members 644 may or may not be precisely machined with a known material elastic modulus in order to improve measurement accuracy, and the structural members may be positioned to inhibit loading scenarios outside of a desired strain measurement direction (or multiple gauges or bridges may be used). Multiple strain gauges may also be used in some embodiments, for example, to compensate for additional loading scenarios and/or temperature. Additionally, in embodiments where load cells are used, the load cells may be placed in-line on structural members. While four structural members 644 and force sensors 646 are illustrated in FIG. 16, it will be appreciated that in other embodiments, greater or few numbers of such components may be used.

It will also be appreciated that, for testing operations where containment force is not being tested, it may be desirable to use a take up drum without any force sensors, and it may also be desirable to provide an ability to swap out different take up drums for different types of tests. For example, it may be desirable to utilize a take up drum with a sturdy, single drum shell capable of withstanding the containment force of numerous layers of packaging material to enable a greater number of layers to be wrapped around the drum before needing to be discarded.

As illustrated in FIG. 17, a sequence of operations 650 for evaluating packaging material using test apparatus 600 may begin in block 652 by weighing a predetermined length of unstretched packaging material and calculating therefrom a weight per unit length, followed by performing a specific containment force test in block 654, both of which may be performed in a similar manner as discussed above for blocks 502 and 504 of FIG. 13. However, rather than forming simulated flaws in a roll of packaging material prior performing simulated flaw testing, a simulated flaw test is performed while dynamically generating simulated flaws in block 656. It will be appreciated that given the use of a solenoid-actuated valve 628, 630 to form simulated flaws, a testing routine may generate simulated flaws dynamically and at any desired frequency, rather than at the predetermined rate that occurs as a result of driving a hole punch into a surface of a packaging material roll to form multiple simulated flaws in multiple layers of packaging material at once. The simulated flaw test performed in block 656 may be performed in a similar manner to that illustrated in FIG. 15, except that periodically simulated flaws are dynamically formed in the packaging material as the test progresses. Then, based upon the testing performed in blocks 654 and 656, performance characteristics of the packaging material may be analyzed, e.g., to determine whether to use the packaging material, and if so, under what operating parameters a load wrapping apparatus should be operated when using the packaging material. In addition, in some embodiments the performance characteristics may be used to compare the packaging material against other types of packaging materials.

Other testing methodologies and protocols may be used in other embodiments. Therefore, it will be appreciated that the invention is not limited to the particular test apparatus and methodologies discussed herein.

Packaging Material Flaw Tracking and Mitigation

It may also be desirable in some embodiments to track packaging material flaws, e.g., on a test apparatus such as described herein or on a load wrapping apparatus such as described herein. Tracking flaws, as described herein, may be used to track flaws that are specifically indicative of potential film breaks, as opposed to flaws in general that may or may not be indicative of a potential film break. In particular, during production of some packaging material, gel counters may be used to detect the formation of "gels" on an extruded packaging material; however, as the packaging material is generally not subjected to tension, it may be difficult, even if the size of the gel is considered, to predict whether or not a gel is likely to cause a film break during wrapping. Embodiments consistent with the invention, on the other hand, may be used to sense holes propagated in a packaging material web in response to subjecting flaws to tension to track and/or characterize such flaws, and in some instances mitigate those flaws as they are conveyed to a body such as a take up drum or load.

It has been found, for example, that film breaks due to packaging material flaws generally start with the formation of a "hole" appearing at the location of a flaw as the packaging material is subject to tension, either within the pre-stretch zone or region of a packaging material delivery system, or in some instances, downstream of such a zone. The hole subsequently increases in size during post-stretch, potentially to the point of causing a full film break. It has also been found, however, that a test apparatus such as described herein, which utilizes a cylindrical take up drum closely aligned with the packaging material delivery system, may be used to cause "partial" film breaks that leave a web of packaging material somewhat attached to the take up drum, thereby enabling an entire roll of packaging material to be evaluated without having to interrupt testing to reattach the packaging material to the take up drum. It is believed, for example, that the close proximity of the take up drum to the pre-stretch rollers in the packaging material delivery system permits a packaging material to be evaluated under typical operating tensions in many situations without having the packaging material completely separate during testing, with the size of the hole generated in response to a flaw being carefully controlled through adjusting the amount of stretch applied by the test apparatus. In addition, in some instances it may be desirable to narrow the width of the packaging material web (e.g., by rolling or roping one or both edges of the packaging material web using a roping mechanism, e.g., about 4 inches inwardly from one or both edges) during testing to inhibit full separation of the web of packaging material during testing. For example, it may be desirable in some embodiments to sufficiently narrow the width of the web such that a simulated flaw that would otherwise cause a full separation of the web of packaging material were narrowing not performed still pass to the take up drum with the web of packaging material intact. The resistance of a roped packaging material to unwinding (thus potentially permitting a hole to tear to a full break) may also be enhanced in some embodiments by tightly rolling the packaging material into a rope, compressing the rope using a pair of opposing knurled nip rollers, forming the rope before pre-stretch to allow the rope to be pre-stretched more tightly into a rope, heating the rope by running friction or the application of heat (e.g., by a hot plate track or other mechanism), and/or performing an incremental pre-stretching of the rope itself during or after pre-stretching the full web of packaging material. The added resistance to unwinding may also in some embodiments permit significantly less of the web to be used as a rope, thus providing a wider web of packaging material to cover a load.

In addition, as will become more apparent below, it may also be desirable in some embodiments to utilize force differentials to detect the occurrence of flaws and/or to use force differentials sensed by multiple force sensors to detect the approximate locations of flaws across the width of a packaging material web (e.g., by using force differentials sensed by a pair of load cells coupled to opposite ends of an idle roller in a packaging material delivery system. Approximate locations may also be determined in some embodiments using an array of sensors (e.g., ultrasonic sensors) extending across the width of the packaging material web.

In addition, in some embodiments such techniques may be utilized on a load wrapping apparatus to track "potential film break flaws" within a cluster of film breaks before actual film breaks occur. Doing so may, in some instances, permit operational setting changes to be implemented to mitigate imminent additional flaws that could potentially cause actual film breaks. The herein-described techniques could also, in some instances, facilitate distinguishing film breaks caused by packaging material flaws from those caused by a load wrapping apparatus. Given that film breaks can be frustrating, time consuming, and costly to operators, many operators will respond to film breaks by simply reducing pre-stretch and/or post-stretch settings, and moreover, doing so can lead to excessive packaging material consumption and/or insufficiently-wrapped loads.

It has been found, however, that fluctuations of packaging material tension, when distinguished from running tension, mechanical and electrical noise, can be used in some embodiments to detect and qualify packaging material flaws (e.g., to determine relative severity of flaws and/or relative positions of flaws across the width of a packaging material web). In addition, it has been found that flaws capable of causing film breaks will generally produce a hole in packaging material during pre-stretch (i.e., when conveyed between upstream and downstream pre-stretch rollers, so by sensing the occurrence of holes, e.g., based upon a drop in tension sensed by one or more force sensors and/or sensing holes using imaging, ultrasonic or other suitable sensors, it may be possible to mitigate such flaws and avoid some film breaks in a load wrapping apparatus, e.g., by dynamically adjusting one or more of pre-stretch or post-stretch amounts upon detection of a hole within a pre-stretch zone (i.e., between upstream and downstream pre-stretch rollers) and/or downstream of a pre-stretch zone, activating a roping mechanism, activating an accumulator (see, e.g., FIGS. 22-23 below), or in the least notifying an operator of a need to adjust one or more operational settings of a load wrapping apparatus. Any or all of pre-stretch, tension, post-stretch, distances between pairs of rollers (e.g., by moving an idle roller transversely to its axis of rotation), may be used in some embodiments to dynamically reduce tension in a web of packaging material to inhibit propagation of a flaw into a film break.

It has further been found that flaws may occur in clusters in real world applications, so an initial flaw or series of flaws could be assumed in some instances to be associated with an increased likelihood of further flaws over some predetermined length of packaging material, number of wrap cycles, etc. As such, mitigation of packaging material flaws may not necessarily occur during the same wrap operation or cycle in which a flaw (or series of flaws) is detected, but may occur in subsequent wrap operations or cycles. Furthermore, it will be appreciated that a detection of no flaws over some period may also be indicative of a decreased likelihood of further flaws, thereby enabling a return to higher and more efficient operational settings.

In some embodiments, for example, flaws may be detected by sensing drops in force sensed by the force sensor(s) coupled to an idle roller positioned downstream of a pre-stretch assembly (i.e., between the downstream pre-stretch roller and the take up drum (in the case of a test apparatus) or a load (in the case of a load wrapping apparatus). In test apparatus 400 discussed above, for example, dispense force sensor(s) 434 may be used to sense flaws, e.g., in combination with some thresholding method capable of distinguishing flaws from other sources of force applied to sensor(s) 434.

As one example, a flaw may be signaled if a force sensed by dispense force sensor(s) 434 drops below a dynamic value that is calculated from a moving window of values. Using a window length of N values, the standard deviation of the sample window ($\sigma_N$), and average of the sample window ($\mu_N$) of the values may be calculated. If the most recent value, $F_i$ is less than the value $\mu_N - T \times \sigma_N$ (where T is a threshold value, e.g., 1-5, to adjust sensitivity of flaw detection), a flaw may be signaled. Data window lengths may be changed to improve sensitivity at given speeds or lengthened to reduce sensitivity to material gauge variation. Furthermore, flaw effects on the windowed mean may be improved in some embodiments by reducing influence on the window mean by coercing the force sensor value of an indicated flawed value closer to previous non-flawed values.

Figure 18:
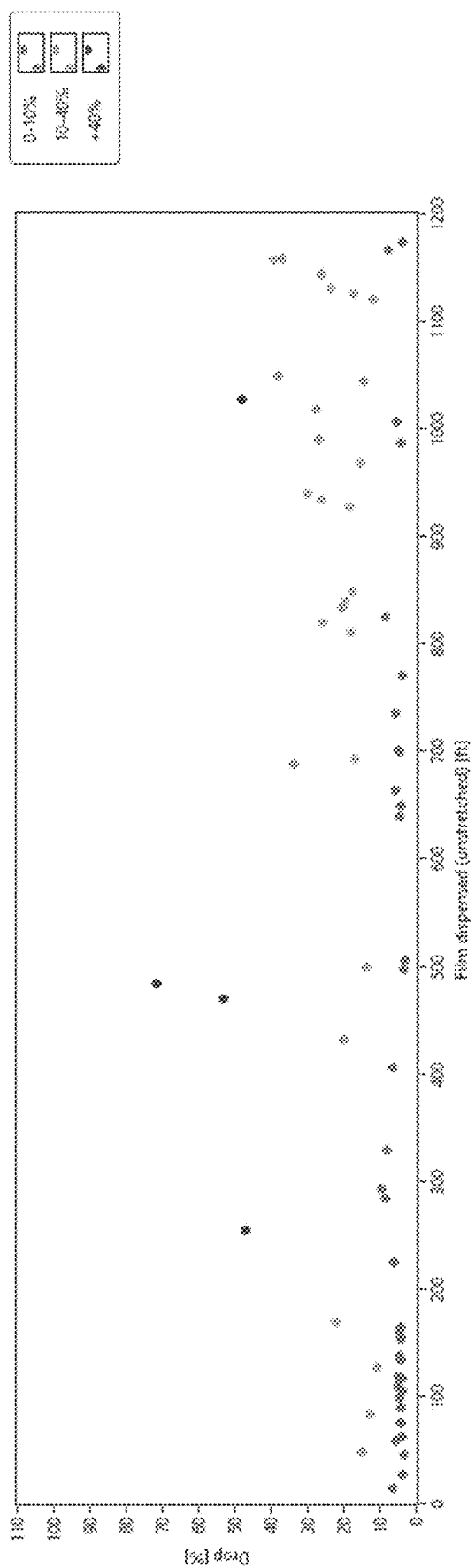
FIG. 18 is an example graph of flaws and their relative severity in an example roll of packaging material.

In one example embodiment, a "percent drop" metric may also be used to detect (and optionally qualify) a flaw, e.g., using the equation:

$$\frac{F_{mean} - F_{flaw}}{F_{mean}} \times 100\%$$

which is done so in order to normalize force drops to a mean force pulled from a running average window. A bigger drop in force will generally signify a larger or more significant or severe flaw, while a smaller drop will generally signify a smaller or less significant or severe flaw. In addition, in this embodiment, a flaw and the percent drop metric discussed above may be mapped according to the flaw's position into a roll of packaging material. This may be performed by calculating the length of unstretched packaging material dispensed in a test from an encoder speed or distance measurement taken from either an upstream pre-stretch drive or an intake drive, as well as time data. When a flaw is detected, it may be plotted at the roll position, e.g., as illustrated in FIG. 18. Various thresholds may be used to distinguish between different categories of flaws in different embodiments, e.g., in one embodiment small, medium, and large flaws may be identified according to the percent drop ranges of 0-10%, 10-40%, and >40%, respectively.

Flaws may be counted and/or graded over a predetermined length of packaging material in some embodiments, and a display such as illustrated in FIG. 18 may display flaws in terms of a severity/length graph for a particular pre-stretch and payout setting, with colors, patterns, or other display variations used to represent flaw severity. In addition, in some embodiments flaws may be graded into one or more categories, e.g., three or more categories, based on probability of producing film breaks on a particular type of load wrapping apparatus.

It may also be desirable in some embodiments to disable flaw detection in some circumstances, e.g., where low dispense speed is detected, where the ramping and/or braking rates of the rollers is too high, to eliminate flaws that arise from outside of specified operating parameters and/or where a second flaw is detected within a detection window following detection of a first flaw (which may be used, for example, to prevent a flaw from being counted as multiple flaws).

In addition, as discussed above, it may be desirable in some embodiments to attempt to detect where a flaw originates in terms of a width or transverse direction of a roll (e.g., top/bottom/middle), which in some embodiments may be performed by estimating where the center of force is acting on an idle roller using data from multiple load cells proximate the ends of the roller. By sensing the shift in force balance of the load cells, it is believed that the relative transverse position of the flaw can be determined, and furthermore, when combined with a correlation of flaw size with the aforementioned percent drop metric, a flaw could be qualified or characterized in terms of both position and size. It is also believed that some benefit may be obtained by sensing forces or otherwise detecting flaws upstream of the downstream pre-stretch roller, e.g., the forces on a pre-stretch idle roller, or the presence of holes in the web between the upstream and downstream pre-stretch rollers, which generally is less susceptible to force changes due to load effects than downstream of the downstream pre-stretch roller.

As noted above, flaw tracking may be performed on a test apparatus or a load wrapping apparatus, and in the latter instance, it may be further be desirable to attempt to predict future forces in the immediate future in order to detect deviations from those predicted forces that may be indicative of flaws or holes in the packaging material. Such prediction may be performed in some embodiments by, for example, monitoring forces sensed during one or more initial revolutions, or by estimating the future forces based upon operational settings.

In some embodiments, for example, a flaw in a stretch wrap packaging material may be evaluated by conveying a web of packaging material from a packaging material roll to a body through a packaging material delivery system that applies a controlled stretch to the packaging material prior to the packaging material being wrapped around the body, sensing a hole associated with a flaw and propagated in the portion of the web of packaging material as a result of application of the controlled stretch to a portion of the web of packaging material containing the flaw, and characterizing the flaw in response to sensing the hole. Where a test apparatus is used, the body to which the packaging material is conveyed is a take up drum, whereas when a load wrapping apparatus is used the body is generally a load.

Various sensors as discussed above may be used in different embodiments, e.g., hole detection sensors such as individual or arrayed ultrasonic sensors or optical sensors (e.g., high speed cameras or light gate arrays tuned for transparent materials), or various force sensors coupled to the packaging material delivery system (e.g., pairs of load cells or other force sensors coupled to opposing ends of idle rollers). In one example embodiment, e.g., as illustrated in FIG. 19, a single ultrasonic sensor 425 may be positioned proximate idle roller 418 (or proximate an exit point of a packaging material delivery system and at a distance sufficient to position web of packaging material 404 fully within the field of view of ultrasonic sensor 425 such that the ultrasonic sensor is capable of detecting holes across the full width of web of packaging material 404. In other embodiments, sensor 425 may be implemented using an optical sensor or an array of optical sensors utilizing various optical sensing technologies such as photoelectric, laser, fiber optic, etc. In such embodiments, one or more suitable light reflectors may be positioned on the other side of the web of packaging material.

Figure 20:
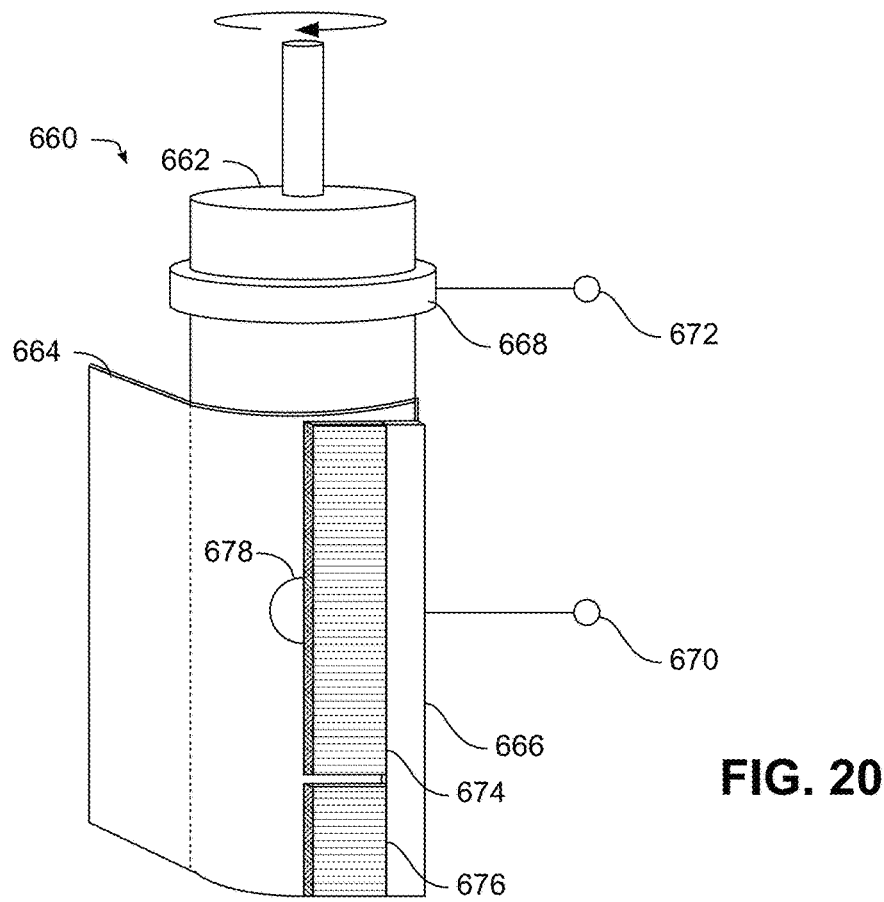
FIG. 20 is a partial perspective view of an idle roller and example implementation of a conductive hole sensor suitable for detecting holes in packaging material in a manner consistent with the invention.

As another example, FIG. 20 illustrates an example implementation of a conductive hole sensor 660 that may be generally positioned proximate a conductive surface across which a web of packaging material is conveyed between a packaging material roll and a take up drum or load, and may include a wiper mechanism positioned opposite the conductive surface and configured to ride along a surface of the web of packaging material and form an electrical coupling with the conductive surface through the packaging material hole.

In the illustrated implementation, for example, the conductive surface to which sensor 660 is proximate is disposed on a roller such as an idle roller 662 that conveys a web of packaging material 664, and sensor 660 includes first and second conductive wiper mechanisms 666, 668 having respective contacts 670, 672. Wiper mechanism 666 may be configured, for example, with one or more brushes with conductive bristles that are selectively placed in electrical contact with the surface of idle roller 662, e.g., brass brushes 674, 676 illustrated in FIG. 20. Wiper mechanism 668 may be configured as a DC motor brush that is continuously in electrical contact with the surface of idle roller 662, and it will be appreciated that by applying a voltage across contacts 670, 672, whenever wiper mechanism 666 is in electrical contact with the surface of idle roller 662, a circuit will be completed and current will flow between wiper mechanisms 666 and 668. As another alternative, a pinch roller mounted against the idle roller and including a conductive surface may be configured to pass current to the surface of the idler roller. A conductive surface may also be formed of a conductive film, a conductive coating, a conductive foam, etc. in some embodiments.

In operation, however, the web of packaging material 664 is interposed between wiper mechanism 666 and the surface of idle roller 662 such that, as the web of packaging material is conveyed by idle roller 662, wiper mechanism 666 will ride along the outwardly-facing surface of packaging material 664 and no electrical contact between wiper mechanism 666 and the surface of idle roller 662. On the other hand, when a hole in the web of packaging material 664 is conveyed past wiper mechanism 666 (e.g., as illustrated by hole 678 in FIG. 20), a portion of wiper mechanism 666 is placed in physical and electrical contact with the surface of idle roller 662 to conduct current between contacts 670, 672.

In some embodiments, wiper mechanism 666 may span a sufficient length of idle roller 662 to cover all or a substantial portion of the width of the web of packaging material 664. In addition, while in some embodiments wiper mechanism 666 may be configured to signal the presence of a hole without providing any indication of its location across the width of the packaging material (e.g., by utilizing a single brush or electrically coupling all of the bristles in multiple brushes to one another), in other embodiments multiple electrically-isolated regions (e.g., as illustrated by brushes 674, 676) may be used to enable the relative position of a hole across the width of the packaging material to be detected. In addition, while brushes 674, 676 are illustrated as being constructed of brass or other metallic bristles, it will be appreciated that other conductive structures may be used in other embodiments, e.g., an array of flat or cantilever springs, plates, strips, wires or other conductive structures suitable for riding along the surface of the packaging material without damaging the packaging material, yet capable of contacting the surface of idle roller 662 whenever a hole passes the structure. It will also be appreciated that, depending up the degree of precision desired for locating the position of a hole, greater or fewer numbers of distinct sensing regions may be defined in different embodiments.

In addition, it will be appreciated that a conductive hole sensor may be used on various idle or driven rollers in different embodiments, e.g., on an idle roller in a pre-stretch assembly, an idle roller downstream of a pre-stretch assembly, etc. In addition, a conductive hole sensor may be used on a non-rotating rod or cylinder, on a flat surface, or against an unsupported length of packaging material in some embodiments. Therefore, the invention is not limited to the specific implementations discussed herein.

In some embodiments, sensors may be arrayed across a width of a web of packaging material to enable a relative position of a flaw or hole to be detected across the width of the web, or the relative position may be based upon differentials in drops in forces sensed by force sensors at opposite ends of an idle roller. In addition, where optical sensors such as high speed cameras or other imaging devices are used, image analysis may be used to analyze captured images to identify the size and/or relative position of a flaw or hole. Where force sensors are used, it may be desirable to use any of the various techniques discussed above to sense drops in force within the force fluctuations that ordinarily occur due to dispensing packaging material to a non-cylindrical load.

In particular, it is believed that a fluctuating force pattern sensed by a force sensor downstream of a pre-stretch assembly induced by corner geometry of a load may present a difficulty in discerning a force drop caused by load geometry from a force drop caused by a propagating hole in the packaging material. It will be appreciated that flaws may be sensed in some embodiments using pre-stretch idle roller feedback, which is generally less sensitive to force fluctuations induced by load geometry. However, it has been found that the propagation of a flaw may not be as pronounced within a pre-stretch region due to a lower force drop amplitude, so it may be desirable in some embodiments to compensate for load geometry induced force fluctuations in order to improve flaw sensitivity.

One manner of performing such compensation is to use a predicted force map and predict the forces at different angular positions of a load relative to a packaging material dispenser. Thus, if the force pattern of an unflawed rotation is known at a given prestretch and payout setting, the sensed force value at a given angular position (unknown if a flaw is present or not) may be compared against a predicted value to offset any influence of corner geometry. The unflawed force function may be collected during an initial rotation cycle or a generic function used with calibration coefficients or constants may be used, among other approaches. This plot may be formed by generating a function of force multipliers dependent upon angular position.

Another manner of performing such compensation is to modify a detection window. Reducing lagging window length force values used to calculate sample average and standard deviation may reduce sensitivity of corner geometry in some instances, and may assist with discerning a flaw from a corner and improve sensitivity loss associated with varying force values as the angular position changes.

Yet another manner of performing such compensation is to vary a rate of force change detection. As noted above, in some embodiments, flaw detection may rely on a threshold comparison of idle roller load cell values. In some embodiments, a flaw may be detected in some embodiments based upon a rate of change of the load cell value, as it is believed that a flaw propagates relatively quickly, and in particular, more quickly than a corner will change force values. Therefore, by measuring the first derivative of the load cell values vs. time (i.e., in units of lb/s), flaws may further be distinguished from corners. This approach would therefore essentially detect when an "acceleration" in force values exceeds the rate typical of corners, and thus is indicative of a flaw rather than a corner. It will be appreciated, however, that other approaches may be used to further distinguish flaws from corner geometry, so the invention is not limited to the particular approaches discussed herein.

Figure 21:
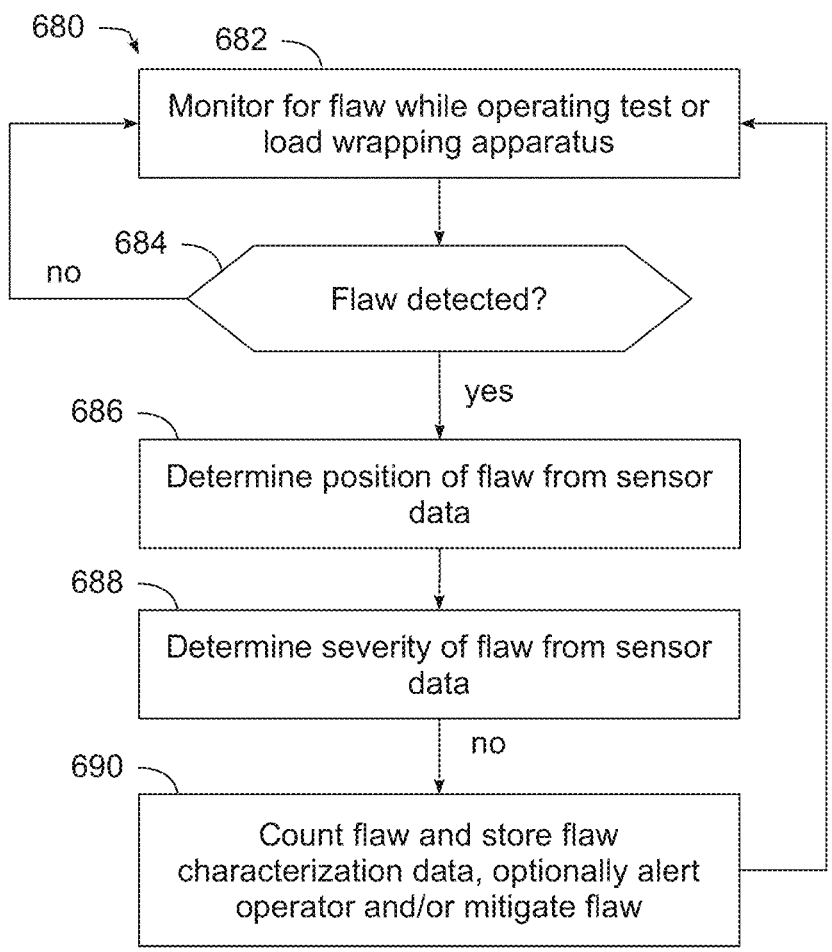
FIG. 21 is a flowchart illustrating an example sequence of operations for performing flaw tracking in a manner consistent with some embodiments of the invention.

FIG. 21 next illustrates an example sequence of operations 680 that may be implemented in a test apparatus or a load wrapping apparatus of the various types disclosed herein to track (and optionally mitigate) flaws in a roll of packaging material. As illustrated in block 682, flaws may be monitored while operating a test or load wrapping apparatus, e.g., using one or more sensors such as force sensors (which may detect flaws via drops in force or tension on an idle roller) or ultrasonic or optical sensors (which may identify actual holes in a web of packaging material).

If no flaw is detected, block 684 returns control to block 682 to continue operating the apparatus and monitoring for flaws. If, however, a flaw is detected, block 684 passes control to block 686 to determine a position of the flaw from sensor data (e.g., by sensing a force differential between opposing ends of an idle roller, sensing a hole with one ultrasonic sensor in an array of ultrasonic sensors extending across a width of the web, or sensing a hole via image analysis of a captured image of the web). Block 688 then determines a severity of the flaw from the sensor data, e.g., based upon correlation of a force drop to a hole size or sensing a size of a hole using an ultrasonic or optical sensor. Block 690 then counts the flaw (e.g., to accumulate a number of flaws detected in the roll) and stores flaw characterization data for flaw for later retrieval. Flaw characterization, in this regard, may include characterizing some aspect of a flaw, e.g., its severity, the size of the hole propagated in the web as a result of applying a controlled stretch to the flaw, the relative position of the flaw across the width of the web and/or the relative position of the flaw within the length of packaging material dispensed from the roll. Control then returns to block 680 to continue operating the apparatus and monitoring for flaws.

In addition, as illustrated in block 690, it may also be desirable to notify or alert an operation as to the occurrence of a flaw or an excessive number of flaws and/or (in the case of usage in a load wrapping apparatus), mitigate the flaw or subsequent flaws by changing operational settings of a load wrapping apparatus (e.g., pre-stretch amount, payout percentage, activation of a roping mechanism, etc.).

In some embodiments, for example, it may be desirable to temporarily increase a dispense rate of a packaging material dispenser (e.g., to a maximum or other elevated dispense rate) as a detected flaw or hole is conveyed to a take up drum or load. Doing so may reduce packaging material tension as quickly as possible upon the first indication of a flaw or hole in order to reduce stress in the unsupported portion of the packaging material web between the packaging material dispenser and the take up drum or load, thereby impeding flaw propagation by the reduction of stress at the flaw or hole's vertexes. The tension control response may be independent of flaw sensing methods and the principal of tension reduction to stop an impending flaw propagation can be applied regardless of the method used to sense the flaw.

Figure 22:
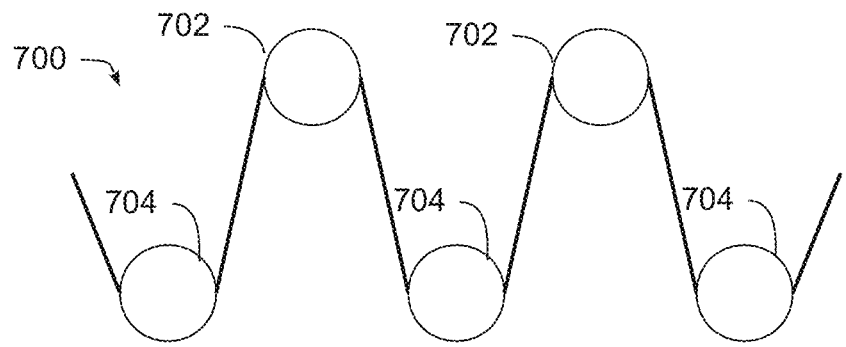
FIGS. 22 and 23 functionally illustrate an accumulator suitable for mitigating film breaks in a manner consistent with the invention.
Figure 23:
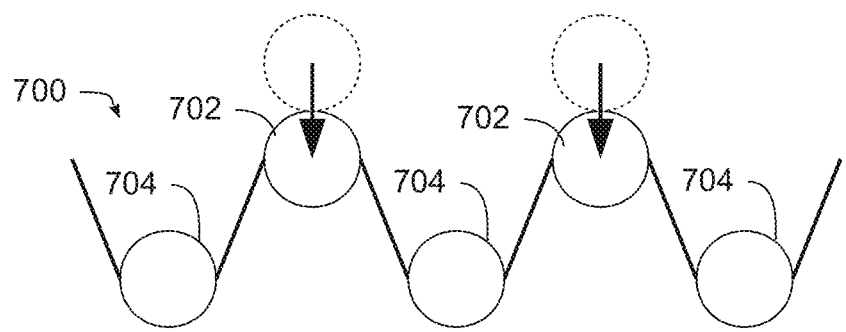

In some embodiments, post-stretch may be reduced (i.e., payout may be increased) dynamically to avert a film break, e.g., by speeding up a packaging material dispenser drive. In other embodiments, e.g., where a variable pre-stretch assembly is used, tension may also be reduced by speeding up an upstream pre-stretch roller drive or otherwise reducing the pre-stretch amount to decrease the amount of pre-stretch applied to the packaging material. In still other embodiments, packaging material tension may be quickly reduced by releasing a stored length of packaging material into the unsupported web of packaging material, e.g., using an accumulator. Such an approach may use a sequence of rollers separated into two banks and offset from each other, with packaging material wound in a "W" configuration through the two banks of rollers, e.g., as illustrated in FIG. 22, whereby an accumulator 700 includes a first bank of rollers 702 and a second bank of rollers 704. The banks are initially offset from each other and upon the indication of a flaw, one or both of the banks may be released from their initial position and forced closer to each other, e.g., as illustrated for rollers 702 in FIG. 23. This action may be forced by pneumatic cylinders, electronic solenoids, spring loaded systems, etc., and a result of this action may reduce tension by effectively "injecting" excess packaging material into the packaging material web stored from the start of the wrap cycle. It will be appreciated that the rollers used in an accumulator may be dedicated for use as an accumulator in some embodiments, while in other embodiments some or all of the rollers may be integrated into a packaging material dispenser, e.g., by moving one or more of idle rollers 416, 418, 422 of the arrangement illustrated in FIG. 5. In addition, each of the aforementioned mitigation tactics may be combined and/or used in connection with roping as described above.

Moreover, it will be appreciated that the flaw mitigation described herein may be temporary in nature in some embodiments, and specific to individual flaws. Thus, for example, if a flaw or hole is detected in the packaging material, and that hole is known to be a specific distance from the take up drum or load, an increase in dispense rate, activation of an accumulator, or activation of a roping mechanism may be performed only for sufficient time to enable the flaw or hole to engage the take up drum or load, whereby the dispense rate may be returned to an original value and/or an accumulator or roping mechanism may be deactivated.

It will be appreciated that sequence 680 is merely exemplary in nature, and that a wide variety of other operations may occur when tracking flaws. Therefore, the invention is not limited to the specific sequence described herein.

Rope Pre-Stretching

It may also be desirable in some embodiments to utilize narrowing of the web of packaging material, e.g., via activating a roping mechanism to roll or rope one or both edges of the web, to avoid film breaks, both on a load wrapping apparatus and a test apparatus. It has been found, however, that pre-stretching or stressing a rope of packaging material film may also be desirable to prevent damage to soft items such as bottled water and towels from the concentrated force of a rope. In particular, in order to reduce stress concentrations associated with a high-tension, tightly wound packaging material rope that could be hazardous to sensitive load materials, additional stretch placed solely on the roped section of a packaging material web may reduce the possibility of damage to a sensitive load.

Figure 24:
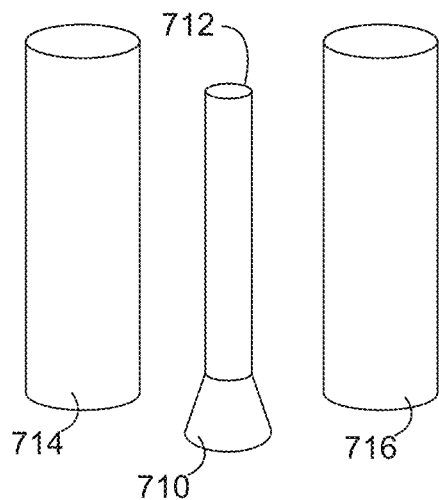
FIG. 24 functionally illustrates an example embodiment of a sleeve for use in pre-stretching a rope in a manner consistent with the invention.
Figure 25:
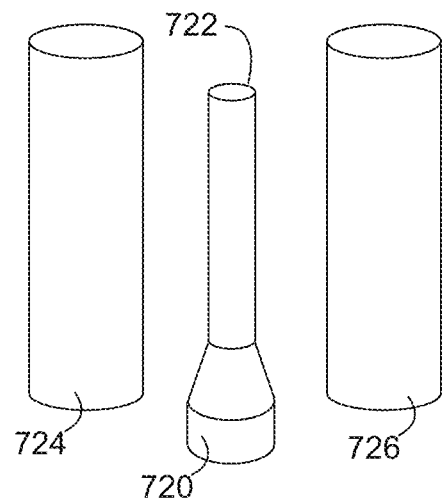
FIG. 25 functionally illustrates another example embodiment of a sleeve for use in pre-stretching a rope in a manner consistent with the invention.

As illustrated in FIG. 24, for example, additional rope stretch may be performed in some embodiments by utilizing a hollow conical frustum sleeve 710 on a pre-stretch idle roller 712 disposed between upstream and downstream pre-stretch rollers 714, 716. This sleeve increases the tangential velocity of the roped section, thereby increasing pre-stretch only upon the roped section of film. It is believed, however, that due to geometric constraints of the distance between the idle roller and the pre-stretch rollers, the size of the sleeve may be too small to significantly increase tension in the roped section of packaging material in some embodiments. In addition, neck-down encountered during operation may create difficulty in effectively stretching the rope. When unstretched packaging material is initially threaded through the rollers, the packaging material has no neck-down loss. As the machine stretches the film, neck-down occurs which reduces the operating diameter of the sleeve as the film slips up the roller. The sleeve therefore may alternatively be fashioned in such a way that there is a section of round sleeve near the bottom of the roller before the chamfered edge of the sleeve to compensate for this neck-down loss and maximize clearance between rollers, as illustrated by alternate sleeve 720 illustrated on pre-stretch idle roller 722 disposed between upstream and downstream pre-stretch rollers 724, 726 in FIG. 25. Additional rollers of conical or cylindrical shape such that the height of the roller is short enough to only stretch the roped section of film may alternatively be employed. These rollers may require an offset from the packaging material path great enough to effectively stretch the roped section, and may in some embodiments be mounted in a cantilever fashion to be placed in an unsupported packaging material length section (e.g., between pre-stretch rollers or between the last idle roller and the load). Additionally, the resistance of a rope to unwinding as the packaging material tears may also be enhanced in some embodiments by pre-stretching the rope, pressing the rope after its formation and/or heating the rope.

CONCLUSION

Some embodiments consistent with the invention may therefore be used to evaluate packaging material for a variety of purposes, such as determining optimum operational settings, e.g., pre-stretch amounts, post-stretch amounts, distances of unsupported packaging material (e.g., based on idle roller positioning), etc.; determining the packaging material with the optimum value in terms of performance and/or cost; determining optimum packaging material and/or operational settings for handling simulated flaws; matching flaws to simulate packaging material types or recipes; applying different control methodologies to simulate different packaging material delivery systems; etc. Some embodiments consistent with the invention may also be used to mitigate film breaks on a load wrapping apparatus by applying changes in operational settings in anticipation of flaws that could otherwise cause film breaks, e.g., by sensing holes or series or clusters of holes in a packaging material during wrapping and via hole detection, tear detection, changes in packaging material force or modulus (e.g., as sensed by an idle roller force sensor), etc. Some embodiments may also be used to count, locate and/or grade flaws on a web of packaging material for their ability to produce film breaks, e.g., based upon a sensed change in force, a relative force change on different force sensors coupled at the ends of an idle roller, via ultrasonic or image sensing of holes or tears, etc.

Moreover, while the invention is not limited to a cylindrical take up drum, it is believed that such a drum design may provide a number of advantages. It is believed, for example, that reliance on measured packaging material tension between a delivery system and a load can be misleading for several reasons. In particular, many packaging material delivery systems are at low point of fluctuation when corner contact is actually made, resulting in much lower incremental containment force (ICF) than average due in part to the fact that the ability to compensate for corners varies substantially in different systems. A cylindrical drum generally cancels out any impact that available film delivery systems may experience with corners and on fluctuating wrap tension. In addition, it has been found that packaging material dispensed to a load generally relaxes over time, causing ICF to be somewhat lower than wrap tension, and packaging materials and operational settings can have a significant impact on the amount of relaxation experienced. A cylindrical drum as disclosed herein may be used to allow for accurate measurement of ICF across a wide range of operational settings and after relaxation of the packaging material. Furthermore, conventional measurement systems have suffered not being able to estimate how to simulate the actual packaging material tension that can be simulated. The calibration of a simulated flaw to the most common gel, edge tears, etc. experienced in actual wrapping (e.g., using a 2.5 mm punch and other methods described above) provides an ability to obtain a realistic measure of how packaging materials will perform relative to each other in real world situations. ICF optimization using simulated flaws as described herein is believed to produce a much more realistic and functional prediction of relative packaging material performance, and the use of a simulated hazard on cylindrical drum generally mitigates the random impact of corner passage on a particular occurrence of a flaw.

Other embodiments will be apparent to those skilled in the art from consideration of the specification and practice of the present invention. Therefore the invention lies in the claims set forth hereinafter.

What is claimed is:

1. A method of tracking flaws in a roll of stretch wrap packaging material, the method comprising:
conveying a web of packaging material from a packaging material roll to a body through a packaging material delivery system that applies a controlled stretch to the packaging material prior to the packaging material being wrapped around the body;
detecting flaws in the web of packaging material as the web of packaging material is conveyed to the body with the controlled stretch applied thereto using a sensor; and
counting a number of detected flaws detected by the sensor;
wherein the packaging material delivery system includes a pre-stretch assembly including upstream and downstream pre-stretch rollers, and wherein detecting flaws in the web of packaging material includes detecting flaws at or upstream of the downstream pre-stretch roller.

2. The method of claim 1, wherein the sensor is among one or more sensors, wherein detecting the flaws includes sensing a hole associated with a first flaw and propagated in the portion of the web of packaging material as a result of application of the controlled stretch to the portion of the web of packaging material using the one or more sensors, and wherein the method further includes characterizing the first flaw in response to sensing the hole with the one or more sensors.

3. The method of claim 2, wherein characterizing the first flaw includes determining a position of the first flaw along a width of the web of packaging material using the one or more sensors.

4. The method of claim 3, wherein the packaging material delivery system includes an idle roller over which the web of packaging material is conveyed under tension, wherein the one or more sensors includes first and second force sensors positioned to sense forces applied proximate first and second ends of the idle roller by the web of packaging material, and wherein determining the position of the first flaw along the width of the web of packaging material includes determining the position of the first flaw using the forces sensed by the first and second force sensors.

5. The method of claim 4, wherein determining the position of the first flaw using the forces sensed by the first and second force sensors includes comparing first and second drops in force respectively sensed by the first and second force sensors.

6. The method of claim 2, wherein characterizing the first flaw includes determining a severity of the first flaw based upon a size of the associated hole sensed using the one or more sensors.

7. The method of claim 6, wherein the packaging material delivery system includes an idle roller over which the web of packaging material is conveyed under tension, wherein the one or more sensors includes a force sensor positioned to sense a force applied to the idle roller by the web of packaging material, and wherein determining the severity of the first flaw includes determining the size of the associated hole based upon a drop in force sensed by the force sensor.

8. The method of claim 1, wherein detecting flaws in the web of packaging material includes detecting flaws between the upstream and downstream pre-stretch rollers.

9. The method of claim 1, wherein detecting flaws in the web of packaging material includes detecting flaws upstream of the downstream pre-stretch roller.

10. The method of claim 1, wherein the sensor comprises a force sensor configured to measure a force in the web of packaging material, wherein detecting the flaws is performed by sensing drops in force with the force sensor.

11. The method of claim 1, wherein the sensor comprises one or more hole detection sensors configured to sense holes in the web of packaging material, wherein detecting flaws in the web of packaging material includes detecting holes associated with the flaws and propagated based upon the controlled stretch applied to the web of packaging material using the one or more hole detection sensors.

12. The method of claim 11, wherein the one or more hole detection sensors includes one or more ultrasonic sensors.

13. The method of claim 11, wherein the one or more hole detection sensors includes one or more optical sensors.

14. The method of claim 11, wherein the one or more hole detection sensors includes an array of hole detection sensors distributed across a width of the web of packaging material.

15. The method of claim 11, wherein the one or more hole detection sensors includes an imaging device configured to capture images of the web of packaging material, and wherein detecting holes associated with the flaws includes analyzing the captured images to identify holes in the web of packaging material.

16. The method of claim 1, wherein the body comprises a take up drum, and wherein the packaging material delivery system, the take up drum and the sensor are disposed in a test apparatus.

17. The method of claim 16, wherein the take up drum is generally cylindrical.

18. The method of claim 1, wherein the body comprises a load, and wherein the packaging material delivery system and the sensor are disposed in a stretch wrapping machine.

19. The method of claim 18, further comprising generating a notification to an operator in response to detecting a flaw in the roll of packaging material with the sensor.

20. The method of claim 19, wherein the notification alerts the operator that the roll of packaging material has excessive flaws.

21. The method of claim 1, further comprising generating a chart of detected flaws to display occurrence, severity and length of packaging material at which detected flaws occur.

22. The method of claim 1, wherein conveying the web of packaging material from the packaging material roll to the body is performed during a wrap operation, wherein detecting the flaw includes sensing a packaging material hole associated with a first flaw during the wrap operation using the sensor, and wherein the method further includes, during the wrap operation and in response to sensing the packaging material hole using the sensor, temporarily increasing a dispense rate of the packaging material dispenser as the packaging material hole is conveyed to the body to reduce propagation of the packaging material hole and thereby avert a film break in the packaging material.

23. The method of claim 22, further comprising, after temporarily increasing the dispense rate of the packaging material dispenser, restoring the dispense rate of the packaging material dispenser to an original value once the packaging material hole has been conveyed to the body.

24. The method of claim 22, further comprising temporarily activating a roping mechanism in response to sensing the packaging material hole using the sensor.

25. The method of claim 22, wherein the sensor comprises an ultrasonic sensor positioned with a field of view spanning at least a portion of a web of the packaging material between the packaging material roll and the body.

26. The method of claim 25, wherein the sensor comprises an array of ultrasonic sensors positioned with fields of view collectively spanning at least a portion of a web of the packaging material between the packaging material roll and the body.

27. The method of claim 22, wherein the sensor comprises one or more optical sensors positioned with respective fields of view to collectively span at least a portion of a web of the packaging material between the packaging material roll and the body.

28. The method of claim 22, wherein the sensor comprises at least one force sensor configured to sense a tension of a web of the packaging material between the packaging material roll and the body.

29. The method of claim 28, wherein the force sensor is coupled to a driven or idle roller across which the web of packaging material is conveyed.

30. The method of claim 22, wherein the sensor comprises a conductive hole sensor positioned proximate a conductive surface across which a web of the packaging material is conveyed between the packaging material roll and the body, wherein the conductive hole sensor includes a wiper mechanism positioned opposite the conductive surface and configured to ride along a surface of the web of packaging material and form an electrical coupling with the conductive surface through the packaging material hole.

31. The method of claim 30, wherein the conductive surface is disposed on a roller.

32. The method of claim 22, wherein the sensor is positioned within a pre-stretch assembly of the packaging material dispenser.

33. The method of claim 22, wherein the sensor is positioned upstream of a pre-stretch assembly of the packaging material dispenser.

34. An apparatus, comprising:
a packaging material delivery system configured to convey a web of packaging material from a packaging material roll to a body; and
a controller coupled to the packaging material delivery system and configured to track flaws in the packaging material roll by:
controlling the packaging material delivery system to convey the web of packaging material from the packaging material roll to the body while applying a controlled stretch to the packaging material prior to the packaging material being wrapped around the body;
detecting flaws in the web of packaging material as the web of packaging material is conveyed to the body with the controlled stretch applied thereto using a sensor; and
counting a number of detected flaws detected by the sensor;
wherein the packaging material delivery system includes a pre-stretch assembly including upstream and downstream pre-stretch rollers, and wherein the controller is configured to detect flaws in the web of packaging material by detecting flaws at or upstream of the downstream pre-stretch roller.

35. The apparatus of claim 34, wherein the controller is configured to detect the flaws by sensing a hole associated with a first flaw and propagated in the portion of the web of packaging material as a result of application of the controlled stretch to the portion of the web of packaging material, and wherein the controller is further configured to characterize the first flaw in response to sensing the hole.

36. The apparatus of claim 34, wherein the apparatus is a test apparatus, and wherein the body comprises a take up drum.

37. The apparatus of claim 34, wherein the apparatus is a stretch wrapping machine, and wherein the body comprises a load.

38. The apparatus of claim 34, wherein the controller is configured to control the packaging material delivery system to convey the web of packaging material from the packaging material roll to the body during a wrap operation, wherein the controller is configured to detect the flaws by sensing a packaging material hole associated with a first flaw during the wrap operation using the sensor, and wherein the controller is further configured to, during the wrap operation and in response to sensing the packaging material hole using the sensor, temporarily increase a dispense rate of the packaging material dispenser as the packaging material hole is conveyed to the body to reduce propagation of the packaging material hole and thereby avert a film break in the packaging material.

* * * * *